US011854444B2

United States Patent
Tsuda et al.

(10) Patent No.: US 11,854,444 B2
(45) Date of Patent: Dec. 26, 2023

(54) DISPLAY DEVICE AND DISPLAY METHOD

(71) Applicant: SONY GROUP CORPORATION, Tokyo (JP)

(72) Inventors: Takamoto Tsuda, Tokyo (JP); Shoichiro Moriya, Tokyo (JP); Daisuke Yoshimori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 4 days.

(21) Appl. No.: 17/627,830

(22) PCT Filed: Jul. 10, 2020

(86) PCT No.: PCT/JP2020/026959
§ 371 (c)(1),
(2) Date: Jan. 18, 2022

(87) PCT Pub. No.: WO2021/020069
PCT Pub. Date: Feb. 4, 2021

(65) Prior Publication Data
US 2022/0277672 A1     Sep. 1, 2022

(30) Foreign Application Priority Data

Jul. 26, 2019   (JP) .................................. 2019-137501

(51) Int. Cl.
*G09G 3/00* (2006.01)
*G06F 3/01* (2006.01)
*G06F 3/14* (2006.01)

(52) U.S. Cl.
CPC ............. *G09G 3/002* (2013.01); *G06F 3/013* (2013.01); *G06F 3/1423* (2013.01); *G09G 2340/0464* (2013.01)

(58) Field of Classification Search
CPC ........ G02B 27/0172; G02B 2027/0123; G02B 2027/0174; G06F 3/011; G06F 3/013;
(Continued)

(56) References Cited

U.S. PATENT DOCUMENTS 9,348,141 B2 *   5/2016   Bar-Zeev ........... G02B 27/0172
2018/0004289 A1  1/2018   Wilson et al.
(Continued)

FOREIGN PATENT DOCUMENTS

CN    107562184 A    1/2018
CN    107683497 A    2/2018
(Continued)

OTHER PUBLICATIONS

International Search Report and Written Opinion of PCT Application No. PCT/JP2020/026959, dated Sep. 24, 2020, 15 pages of ISRWO.

*Primary Examiner* — Nelson M Rosario
(74) *Attorney, Agent, or Firm* — CHIP LAW GROUP

(57) ABSTRACT

Provided are a display device and a display method enabling to implement AR with excellent visibility by using a retinal direct drawing display device. The display device includes a display unit that projects a visual information image including visual information onto a retina of a user and displays the visual information in superimposition with a field of view of the user. The display device further includes a visual information control unit that controls displaying of the visual information by the display unit, in which the display unit displays the visual information that is blurred based on situation.

17 Claims, 30 Drawing Sheets

(58) Field of Classification Search
CPC ...... G06F 3/017; G06F 3/0426; G06F 3/0481; G06F 3/1423; G06T 19/00; G09G 3/002; G09G 2340/0464; G09G 2354/00; G09G 2370/022
See application file for complete search history.

(56) References Cited

U.S. PATENT DOCUMENTS

| | | |
|---|---|---|
| 2018/0174366 A1 | 6/2018 | Nishibe et al. |
| 2019/0025815 A1 | 1/2019 | Saadoun et al. |

FOREIGN PATENT DOCUMENTS

| | | |
|---|---|---|
| JP | 2006-308674 A | 11/2006 |
| JP | 2015-118832 A | 6/2015 |
| JP | 2018-004950 A | 1/2018 |
| KR | 10-2018-0004018 A | 1/2018 |
| TW | 201804314 A | 2/2018 |
| WO | 2006/118057 A1 | 11/2006 |
| WO | 2016/203792 A1 | 12/2016 |

* cited by examiner

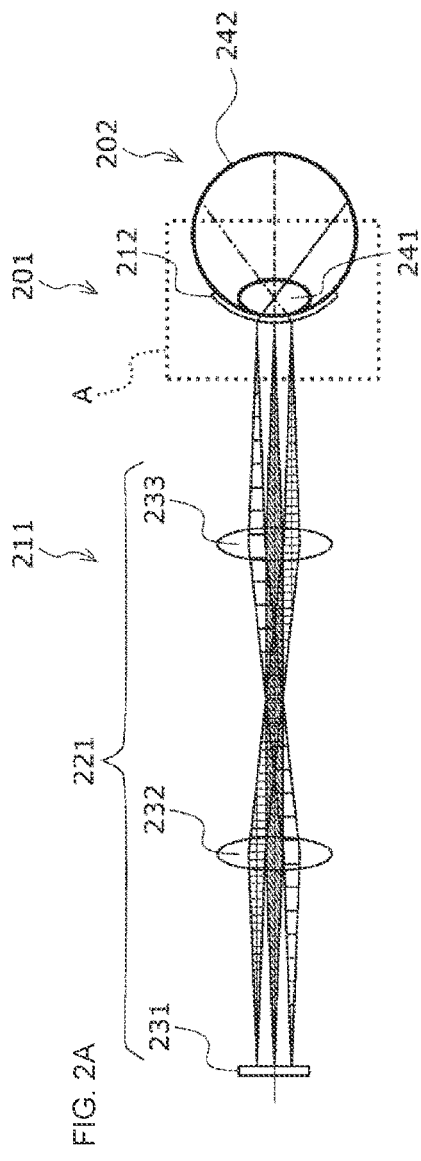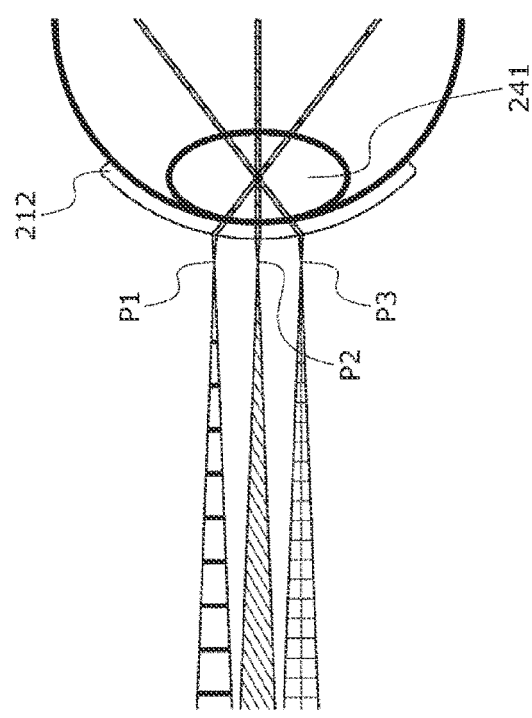
FIG. 2A
FIG. 2B

SILENCE

NORMAL SMALL SOUND

NORMAL LARGE SOUND

MANY PIECES OF SOUND

ONE PIECE OF SOUND

LOW-PITCHED SOUND

HIGH-PITCHED SOUND

STANDBY STATE

WHEN ACTIVATED
(OPERABLE STATE)

WHEN SUPERIMPOSED ON
SPECIFIC EQUIPMENT

WHEN GRIPPED

WHEN PRESSED FROM RIGHT SIDE

WHEN GRABBED
(Drag & Move)

DISPLAY DEVICE AND DISPLAY METHOD

CROSS REFERENCE TO RELATED APPLICATIONS

This application is a U.S. National Phase of International Patent Application No. PCT/JP2020/026959 filed on Jul. 10, 2020, which claims priority benefit of Japanese Patent Application No. JP 2019-137501 filed in the Japan Patent Office on Jul. 26, 2019. Each of the above-referenced applications is hereby incorporated herein by reference in its entirety.

TECHNICAL FIELD

The present technology relates to a display device, a display method, and a program, and more particularly to a retinal direct drawing display device, a display method, and a program.

BACKGROUND ART

Conventionally, it has been proposed to implement augmented reality (AR) by using a retinal direct drawing display device (see, for example, Patent Document 1).

CITATION LIST

Patent Document

Patent Document 1: Japanese Patent Application Laid-Open No. 2015-118832

SUMMARY OF THE INVENTION

Problems to be Solved by the Invention

In the retinal direct drawing display device, an image including visual information is projected on a retina of a user, and the image is drawn directly on the retina. As a result, the visual information is displayed in superimposition with a real world in the user's field of view. Furthermore, in the retinal direct drawing display device, even if the user's field of view moves, the visual information is always in focus. Therefore, since the visual information is focused even in a situation of originally being out of focus and blurred, the user may feel uncomfortable and visibility may be reduced.

The present technology has been made in view of such a situation, and an object thereof is to implement AR with excellent visibility by using a retinal direct drawing display device.

Solutions to Problems

A display device according to one aspect of the present technology includes: a display unit configured to project a visual information image including visual information onto a retina of a user and display the visual information in superimposition with a field of view of the user; and a visual information control unit configured to control displaying of the visual information by the display unit, in which the display unit displays the visual information that is blurred in accordance with a situation.

A display method according to one aspect of the present technology includes: displaying visual information that is blurred in accordance with a situation, by using a display device configured to project a visual information image including the visual information onto a retina of a user and display the visual information in superimposition with a field of view of the user.

A program according to one aspect of the present technology causes a computer to execute processing of displaying visual information that is blurred in accordance with a situation, in which the computer is of a display device configured to project a visual information image including the visual information onto a retina of a user and display the visual information in superimposition with a field of view of the user.

In one aspect of the present technology, a visual information image including visual information is projected on a retina of a user, the visual information is displayed in superimposition with a field of view of the user, and the visual information that is blurred in accordance with a situation is displayed.

BRIEF DESCRIPTION OF DRAWINGS

FIGS. 2A and 2B are views illustrating a configuration example of a projection system included in a display unit of the display device in FIG. 1.

MODE FOR CARRYING OUT THE INVENTION

Hereinafter, an embodiment for implementing the present technology will be described. The description will be given in the following order.
1. Embodiment
2. Modification
3. Other 1. Embodiment An embodiment of the present technology will be described with reference to FIGS. 1, 2A, 2B, 3A, 3B, 3C, 4, 5, 6, 7, 8, 9, 10A, 10B, 10C, 11A, 11B, 12A, 12B, 13, 14, 15, 16, 17, 18, 19, 20, 21, 22, 23A, 23B, 23C, 24A, 24B, 24C, 25, and 26.

<Configuration Example of Display Device>

Figure 1:
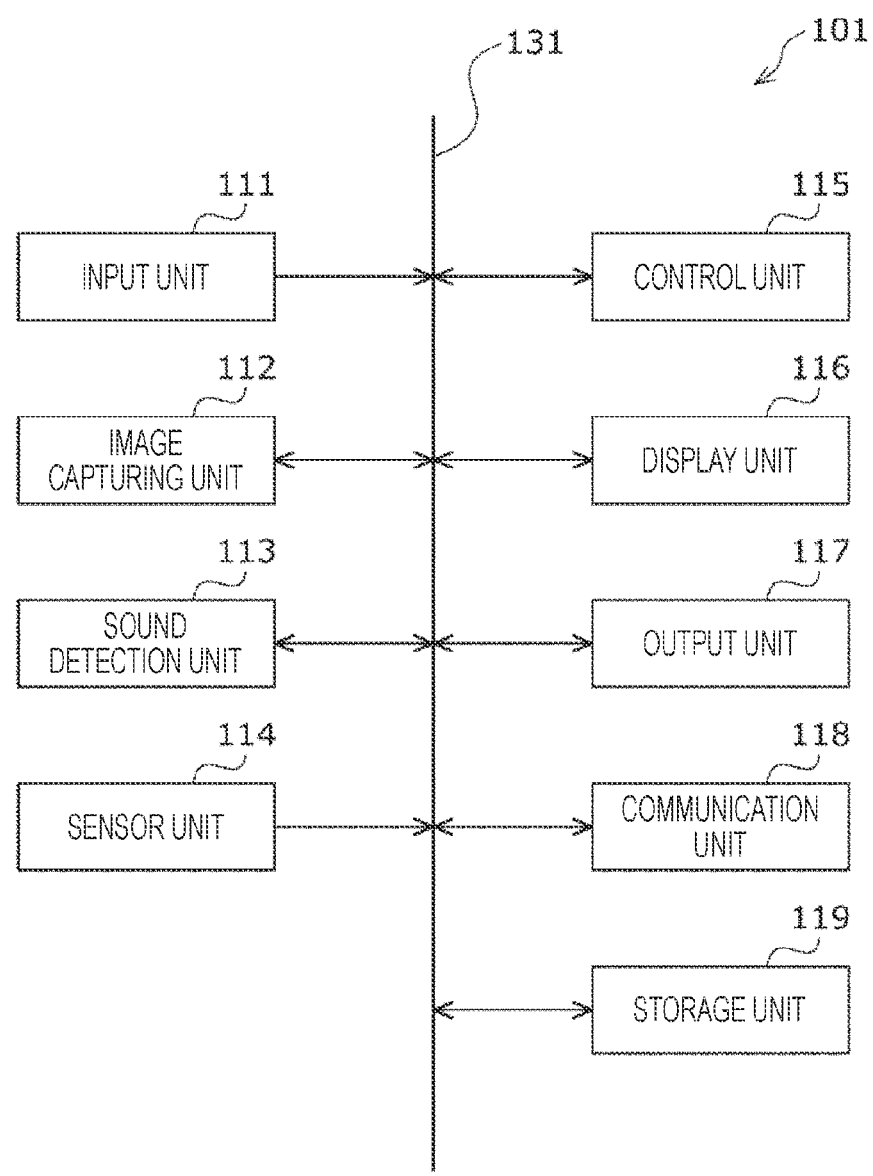
FIG. 1 is a block diagram illustrating a configuration example of a display device to which the present technology is applied.

FIG. 1 is a block diagram illustrating an embodiment of a display device 101 to which the present technology is applied.

The display device 101 is an eyewear display device of a retinal direct drawing method. The display device 101 projects an image including visual information (hereinafter, referred to as a visual information image) onto a retina of a user in a state of being worn on the head of the user like glasses, and draws the visual information image directly on the retina of the user. As a result, in a field of view of the user, the visual information is displayed in superimposition with a real world, and the user can view the visual information in superimposition with the real world.

The display device 101 includes an input unit 111, an image capturing unit 112, a sound detection unit 113, a sensor unit 114, a control unit 115, a display unit 116, an output unit 117, a communication unit 118, and a storage unit 119. The input unit 111, the image capturing unit 112, the sound detection unit 113, the sensor unit 114, the control unit 115, the display unit 116, the output unit 117, the communication unit 118, and the storage unit 119 are mutually connected via a bus 131.

The input unit 111 includes an input device such as a button or a switch. The input unit 111 is used, for example, for operation of the display device 101 and input of various data, instructions, and the like.

The image capturing unit 112 includes, for example, an image sensor such as a CMOS sensor. The image capturing unit 112 captures an image of a range including a user's field of view. The image capturing unit 112 outputs data (hereinafter, referred to as captured image data) of an image (hereinafter, referred to as a captured image) obtained as a result of image capturing.

The sound detection unit 113 includes, for example, a plurality of microphones. The microphones are provided, for example, at least at three locations of the front, left, and right of the eyewear display device 101 so that a position of a sound source around the user can be detected. Specifically, for example, the microphones are provided at least at three locations of a central portion of a front surface of the eyewear display device 101 and left and right temples. The sound detection unit 113 detects sound around the user and outputs data (hereinafter, referred to as sound data) of the detected sound.

The sensor unit 114 includes an inertial measurement unit (IMU) including an acceleration sensor and an angular velocity sensor, a position sensor that receives a global navigation satellite system (GNSS) signal from a GNSS satellite and detects a current position, and the like. The sensor unit 114 outputs data (hereinafter, referred to as sensor data) indicating a detection result of each sensor.

The control unit 115 includes, for example, a processor including a central processing unit (CPU) or the like. The control unit 115 controls each unit of the display device 101, and performs processing such as generation of a visual information image, control of displaying of visual information, and sharing of visual information with another display device.

The display unit 116 projects a visual information image onto a retina of the user to display the visual information in superimposition within a field of view of the user. Furthermore, as described later, the display unit 116 displays visual information that is blurred in accordance with a situation. Note that a specific configuration example of the display unit 116 will be described later with reference to FIGS. 2A and 2B and the like.

The output unit 117 includes an output device such as, for example, a display, a light emitting element, and a speaker. The output unit 117 outputs information indicating a state or the like of the display device 101 by, for example, an image, light, sound, or the like. Furthermore, for example, the output unit 117 includes an output terminal for output of image data, sound data, and the like.

The communication unit 118 includes a communication device and performs wireless communication with surrounding equipment. Note that a communication method of the communication unit 118 is not particularly limited, and for example, short-range wireless communication such as Bluetooth (registered trademark) or near field communication (NFC) is adopted. Furthermore, the communication unit 118 may support a plurality of communication methods.

The storage unit 119 includes, for example, a magnetic storage device such as a read only memory (ROM), a random access memory (RAM), and a flash memory, a semiconductor storage device, an optical storage device, a magneto-optical storage device, or the like. The storage unit 119 stores various programs, data, and the like used for processing of the display device 101.

<Configuration Example of Projection System 201>

FIGS. 2A, 2B, 3A, 3B, and 3C illustrate a configuration example of a projection system 201 provided in the display unit 116 of the display device 101 in FIG. 1.

FIG. 2A is a schematic view illustrating a configuration example of the projection system 201. FIG. 2B is an enlarged view of a region A of A of FIG. 2A. Note that FIGS.

2A and 2B schematically illustrates a main light beam and a peripheral light beam emitted from a projection optical system 221.

The projection system 201 includes a projection device 211 and an optical element 212. Since the projection system 201 is used in a state where a positional relationship between the optical element 212 and an eyeball 202 is fixed, a distance between the optical element 212 and a rotation center of the eyeball 202 does not change even if the eyeball 202 rotates. Therefore, it is not necessary to adjust projection light in accordance with a movement of the eyeball, and it is not necessary to provide an eye tracking device.

The projection device 211 includes the projection optical system 221. The projection optical system 221 includes a two-dimensional array display element 231, a lens 232, and a lens 233.

The two-dimensional array display element 231 includes, for example, a liquid crystal display (LCD), a liquid crystal on silicon (LCOS), or an organic light-emitting diode (OLED). For example, under control of the control unit 115, from illumination light emitted from a light source (not illustrated), the two-dimensional array display element 231 forms projection light for displaying of a visual information image, and emits the projection light. For example, on an optical path between the light source and the two-dimensional array display element 231, an imaging system and a color separation synthesis system may be provided.

The lens 232 and the lens 233 are provided between the two-dimensional array display element 231 and the optical element 212. As illustrated in FIG. 2A, projection light emitted from the two-dimensional array display element 231 is refracted by the lens 232, further refracted by the lens 233, and incident on the optical element 212.

As illustrated in FIG. 2B, the projection system 201 is configured such that the projection light refracted by the lens 233 is focused at positions P1 to P3 immediately before the optical element 212. By focusing the projection light immediately before the optical element 212, it is possible to suppress a peripheral light beam from being vignetted by the pupil, and to sufficiently allow the peripheral light beam to be incident on the pupil. That is, the optical element 212 can collect a peripheral light beam near the pupil and project a bright image on a retina 242. Note that a distance between the focal point and the optical element 212 can be set in accordance with an amount of the peripheral light beam desired to be incident on the pupil.

Note that a main light beam of projection light incident on the optical element 212 preferably has a direction in which the projection light can be collected near the pupil after being incident on the optical element 212, and more preferably is substantially parallel to an optical axis. That is, the main light beam of the projection light preferably reaches the optical element 212 as a telecentric light beam. Therefore, it is preferable that the projection optical system 221 is configured such that the projection light having the main light beam substantially parallel to the optical axis is to be incident on the optical element 212.

Figure 3A:
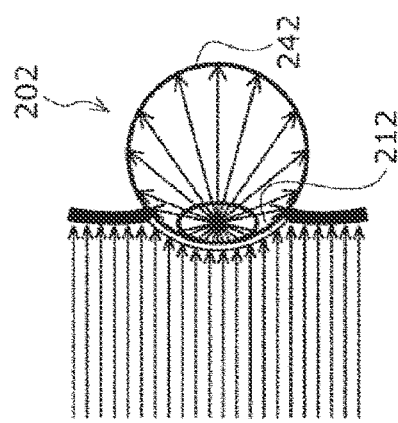
FIGS. 3A, 3B, and 3C are views illustrating a relationship between an optical element and projection light.
Figure 3B:
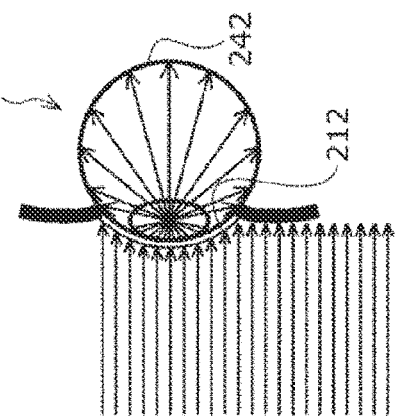
Figure 3C:
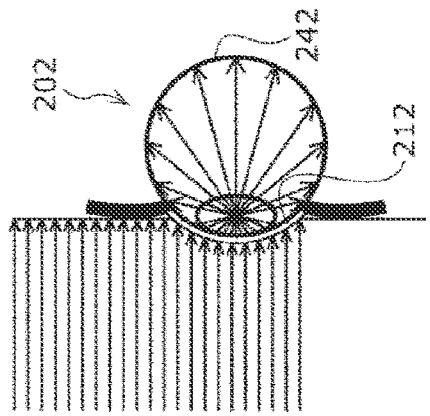

As illustrated in FIGS. 3A, 3B, and 3C, since the main light beam of the projection light is substantially parallel to the optical axis, the projection light can be collected near the pupil even if a position of the optical element 212 and the eyeball 202 changes. For example, even if the optical element 212 and the eyeball 202 move from the position illustrated in FIG. 3A to the position illustrated in FIG. 3B or 3C, the projection light can be collected near the pupil and guided to the retina 242. Furthermore, when the main light beam of the projection light is substantially parallel to the optical axis, an angle and a position of the main light beam of the projection light incident on the optical element 212 are always unchanged, even if a position of the optical element 212 and the eyeball 202 changes. Therefore, it is possible to prevent a change of resolution of a central portion of a field of view recognized by the user, even if the eyeball 202 is moved.

Furthermore, the projection optical system 221 is configured such that the projection light is collected near the pupil and reaches the retina 242. That is, the projection light may be projected onto the retina 242 by so-called Maxwellian view. For example, as illustrated in FIG. 2A, the projection light emitted from the projection optical system 221 is diffracted by the optical element 212. The diffracted projection light is collected near the pupil and reaches the retina 242.

In the Maxwellian view optical system, since one dot (a minimum display unit) in an image passes through one point on a crystalline lens 241, the one-dot image on the retina is less susceptible to a state of the crystalline lens 241. Therefore, even a user having, for example, myopia, hyperopia, astigmatism, or the like can clearly recognize the image. Furthermore, a virtual image that appears to float in a space is focus-free, and the virtual image comes into focus at any distance from the eye.

The optical element 212 causes the projection light to be collected near the pupil and to reach the retina 242. The optical element 212 is used in a state where a positional relationship with the eyeball 202 is fixed. Preferably, as illustrated in FIGS. 2A and 2B, the optical element 212 is provided in contact with the eyeball 202, for example, and is used in a state where the positional relationship between the optical element 212 and the pupil is fixed. Furthermore, the optical element 212 may have a curved surface, and a curvature center of the curved surface and a rotation center of the eyeball 202 may be concentric. By fixing the positional relationship between the optical element 212 and the pupil, the projection light refracted by the lens 233 can be collected near the pupil even if the eyeball 202 rotates to change a position of the pupil.

The optical element 212 includes, for example, a contact lens-shaped optical element, and preferably includes a contact lens-shaped holographic optical element. Since the optical element 212 includes the contact lens-shaped optical element, a field of view in which an image by projection light can be recognized can be enlarged. Furthermore, since the optical element 212 includes the contact-lens-shaped optical element, it is possible to easily enlarge an eye box (that is, a spatial region around the eyeball, in which an image by projection light can be recognized).

In this way, the projection system 201 projects projection light representing a visual information image onto the retina 242, so that a virtual image of visual information appears to float in a space. That is, the virtual visual information is displayed in superimposition with a real world in the user's field of view.

Note that the projection system 201 may be individually provided for both eyes of the user, or may be provided only for one eye. Note that, in the former case, stereoscopic vision can be used, and the user can feel perspective of visual information more naturally.

<Configuration Example of Information Processing Unit 301>

Figure 4:
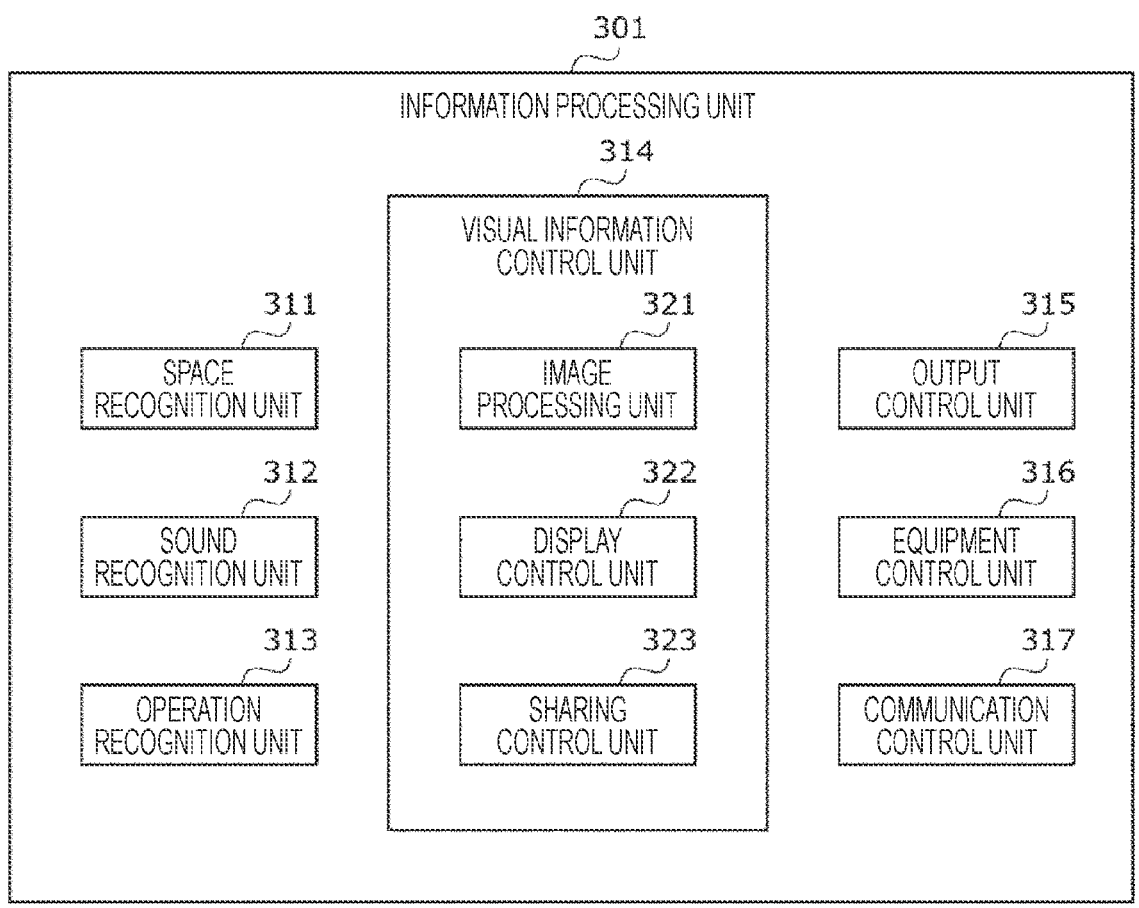
FIG. 4 is a block diagram illustrating a configuration example of an information processing unit implemented by a control unit of the display device of FIG. 1.

FIG. 4 illustrates, for example, a configuration example of an information processing unit 301 implemented by the control unit 115 of the display device 101 in FIG. 1 executing a program.

The information processing unit 301 includes a space recognition unit 311, a sound recognition unit 312, an operation recognition unit 313, a visual information control unit 314, an output control unit 315, an equipment control unit 316, and a communication control unit 317.

The space recognition unit 311 performs various types of recognition processing on a space including a field of view of the user who uses the display device 101, that is, a space on which visual information is superimposed by the display device 101, on the basis of captured image data supplied from the image capturing unit 112, sound data supplied from the sound detection unit 113, and sensor data supplied from the sensor unit 114. For example, the space recognition unit 311 performs recognition processing of a type, a position, an orientation, a size, a shape, a feature point, and the like of an object in the space. Furthermore, for example, the space recognition unit 311 performs recognition processing of a range and a movement of the user's field of view, a direction and a movement of a line-of-sight, and the like.

The sound recognition unit 312 performs sound recognition processing on sound data supplied from the sound detection unit 113. For example, the sound recognition unit 312 performs recognition processing of a position of a sound source around the user, a state of sound emitted from the sound source (for example, a type, a volume, a pitch, a tone, sound quality, and the like), an utterance content, and the like.

The operation recognition unit 313 recognizes a user's operation on visual information on the basis of recognition results by the space recognition unit 311 and the sound recognition unit 312. For example, the operation recognition unit 313 recognizes an operation on visual information on the basis of a motion of a hand of the user recognized by the space recognition unit 311. Furthermore, for example, the operation recognition unit 313 recognizes an operation on visual information on the basis of user's voice recognized by the sound recognition unit 312.

The visual information control unit 314 performs generation of visual information, control of displaying of visual information by the display unit 116, and the like. Note that, as described later, the visual information control unit 314 blurs visual information in accordance with a situation. The visual information control unit 314 includes an image processing unit 321, a display control unit 322, and a sharing control unit 323.

The image processing unit 321 generates a visual information image including visual information. Note that, as described later, the image processing unit 321 generates a visual information image including visual information that is blurred in accordance with a situation.

The display control unit 322 supplies data of the visual information image (hereinafter, referred to as visual information image data) to the display unit 116, and controls the display unit 116 to control a position, a timing, and the like at which the visual information is displayed.

The sharing control unit 323 controls a process of sharing visual information with another display device. By performing the process of sharing visual information with another display device, for example, among visual information displayed on another display device, visual information virtually existing in a field of view of a user of the display device 101 is displayed on the display device 101. Furthermore, conversely, among visual information displayed on the display device 101, visual information virtually existing in a field of view of a user of another display device is displayed on the another display device.

The output control unit 315 controls output of various types of information and data by the output unit 117.

The equipment control unit 316 controls equipment (for example, an electrical appliance or the like) around the user. For example, the equipment control unit 316 transmits a control signal to the equipment around the user in accordance with a user operation on visual information, and controls the equipment.

The communication control unit 317 controls communication by the communication unit 118.

<Processing of Display Device 101>

Next, processing of the display device 101 will be described with reference to FIGS. 5, 6, 7, 8, 9, 10A, 10B, 10C, 11A, 11B, 12A, 12B, 13, 14, 15, 16, 17, 18, 19, 20, 21, 22, 23A, 23B, 23C, 24A, 24B, 24C, 25, and 26.

<Window Display Control Process>

Figure 5:
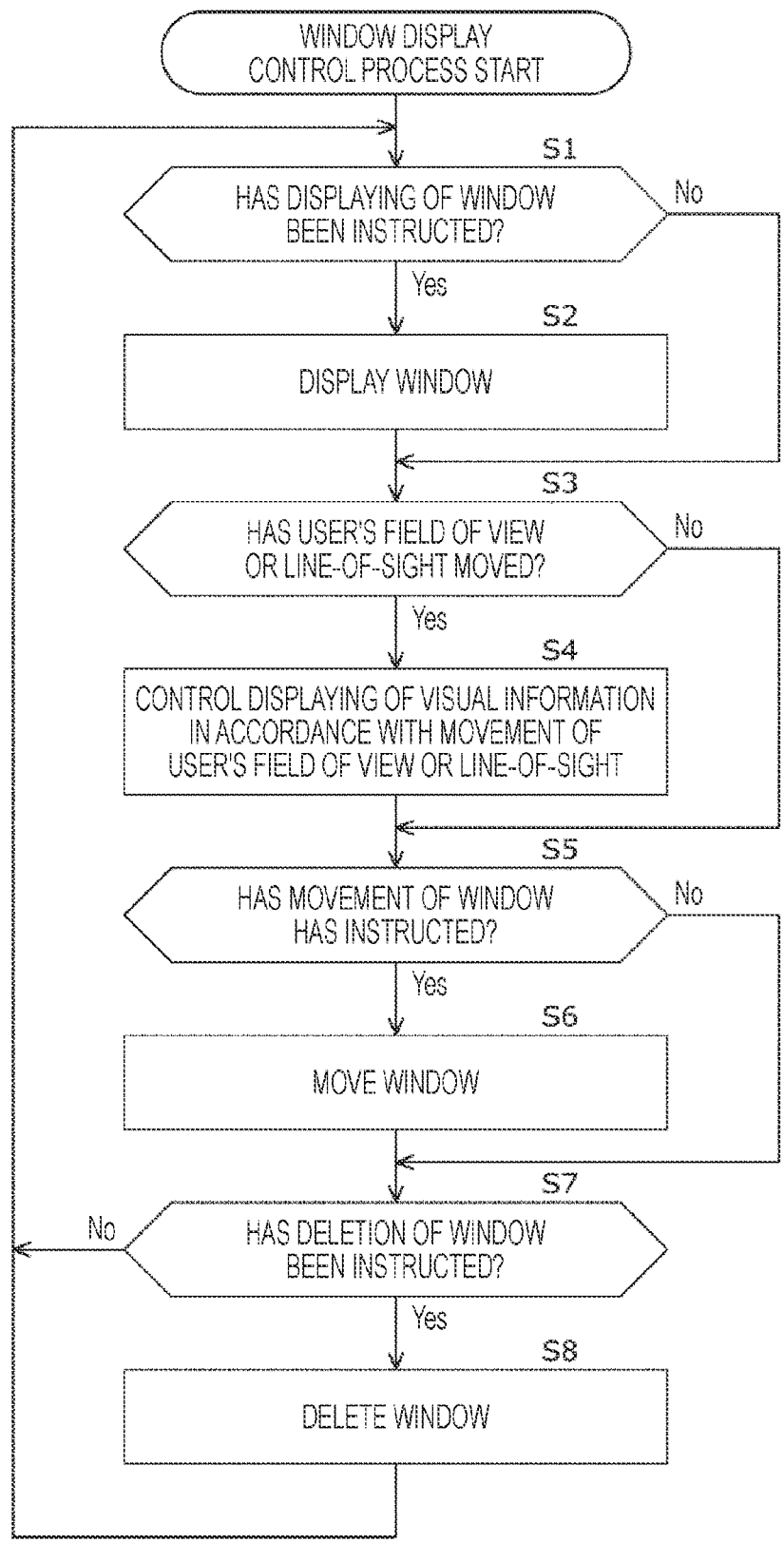
FIG. 5 is a flowchart for explaining a window display control process.

First, a window display control process executed by the display device 101 will be described with reference to a flowchart of FIG. 5.

This process is started when power of the display device 101 is turned on, and is ended when the power is turned off, for example.

In step S1, the display device 101 determines whether or not displaying of a window has been instructed.

For example, the space recognition unit 311 performs a process of detecting a hand in a captured image supplied from the image capturing unit 112. In a case where a hand is detected, the space recognition unit 311 further performs a process of detecting a shape of the hand.

The operation recognition unit 313 performs a process of recognizing a gesture on the basis of a detection result of the shape of the hand. Then, the operation recognition unit 313 recognizes the gesture. Further, in a case where the recognized gesture coincides with a gesture instructing to display the window, it is determined that displaying of the window has been instructed, and the process proceeds to step S2.

Figure 6:
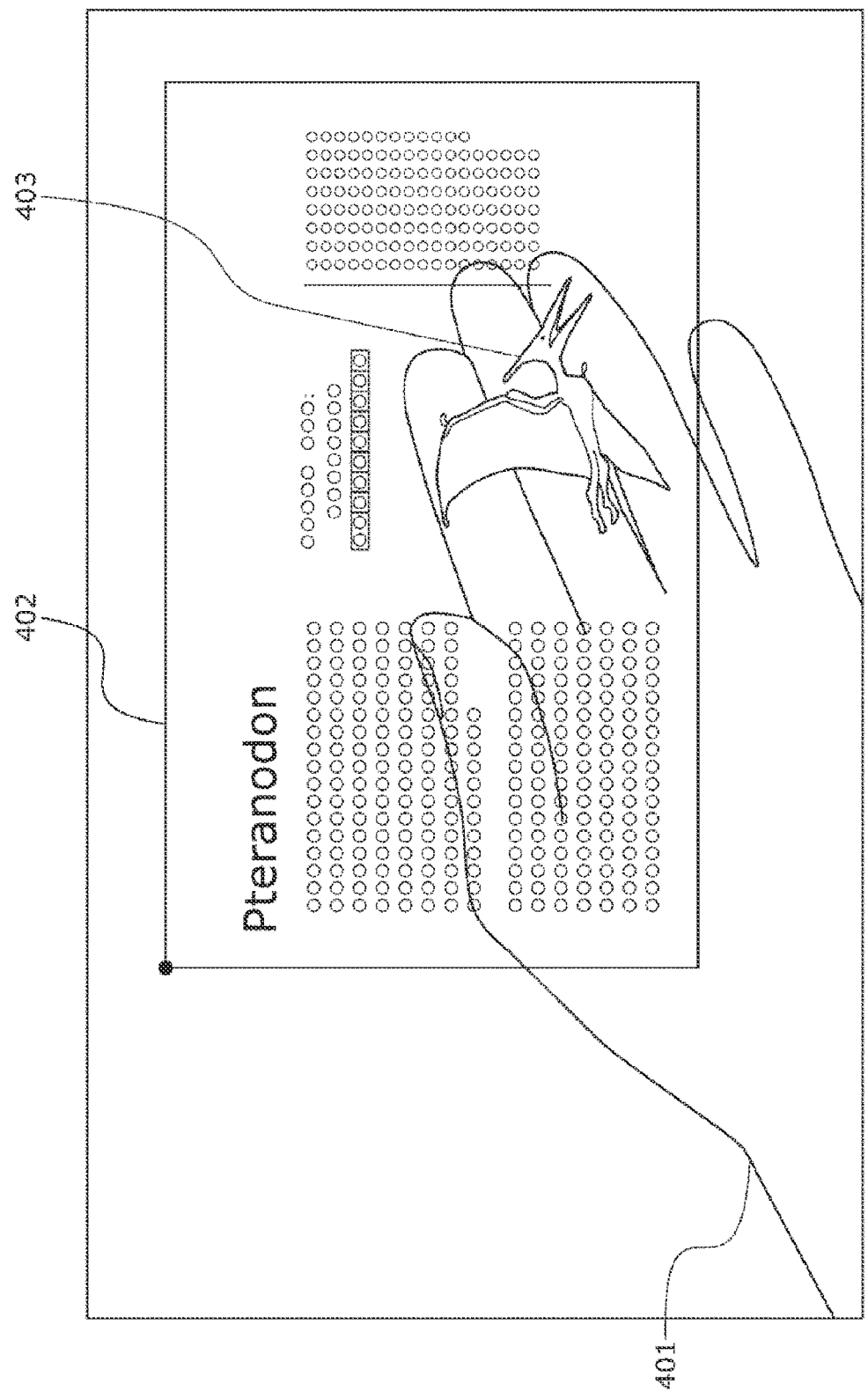
FIG. 6 is a view illustrating a display example of a window.

For example, as illustrated in FIG. 6, in a case where the operation recognition unit 313 recognizes a gesture that is stationary for a predetermined time or more in a state where a palm 401 is directed upward, it is determined that displaying of the window has been instructed.

In step S2, the display device 101 displays the window.

Specifically, the image processing unit 321 generates a visual information image including the window, which is one of visual information.

The display control unit 322 supplies visual information image data to the display unit 116, and controls the display unit 116 to display the window in accordance with a position where the gesture is performed, in the user's field of view.

As a result, for example, as illustrated in FIG. 6, a window 402 is displayed in accordance with a position of the palm 401, in the user's field of view. In this example, an animation of a dinosaur 403 and an explanatory sentence related to the dinosaur 403 are displayed in the window 402.

Thereafter, the process proceeds to step S3.

Whereas, in step S1, in a case where the operation recognition unit 313 does not recognize a gesture instructing to display the window, it is determined that displaying of the window is not instructed, the process of step S2 is skipped, and the process proceeds to step S3.

In step S3, the space recognition unit 311 determines whether or not the user's field of view or line-of-sight has moved. For example, on the basis of captured image data supplied from the image capturing unit 112 and sensor data of each speed sensor and acceleration sensor included in sensor data supplied from the sensor unit 114, the space recognition unit 311 determines whether or not the user's field of view or line-of-sight has moved. In a case where it is determined that the user's field of view or line-of-sight has moved, the process proceeds to step S4.

In step S4, the display device 101 controls displaying of the visual information in accordance with the movement of the user's field of view or line-of-sight. Specifically, visual information such as a window is displayed in the user's field of view by a process similar to step S2. At this time, the image processing unit 321 and the display control unit 322 generate a visual information image and control a display position of each piece of visual information, in consideration of visual information following the movement of the user's field of view and visual information not following the movement of the user's field of view. Furthermore, the image processing unit 321 blurs the visual information as necessary.

Figure 7:
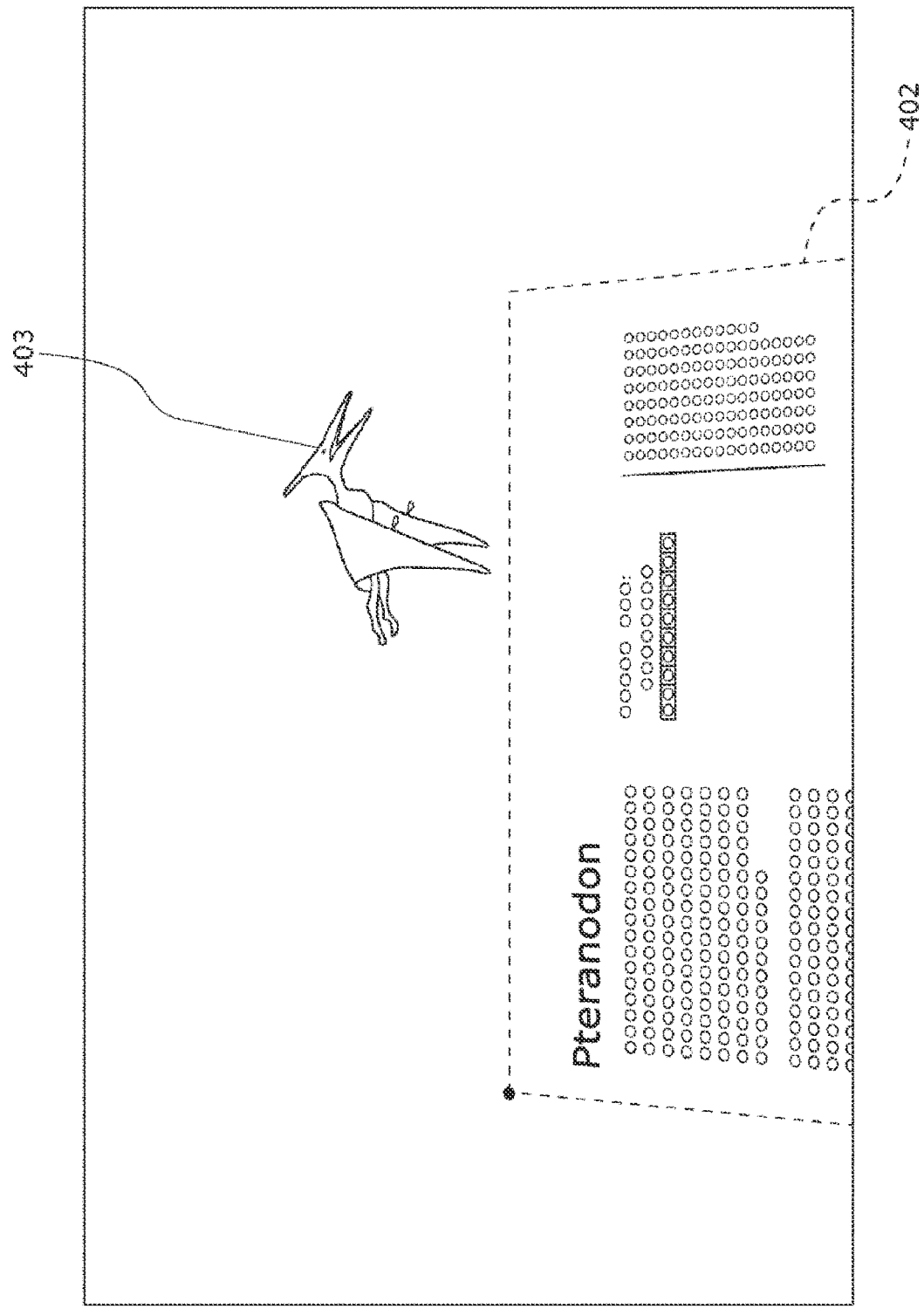
FIG. 7 is a view illustrating a display example of a window.

FIG. 7 illustrates a display example of visual information in a case where the user's field of view has moved upward from the state of FIG. 6.

In this example, the window 402 is displayed in superimposition at the same position in a real space without following the movement of the user's field of view. Note that the display position of the window 402 is set on the basis of, for example, a feature point in the real space.

Whereas, the dinosaur 403 existing in the window 402 in the example of FIG. 6 follows the movement of the user's field of view, and is displayed with an animation at substantially the same position as the example of FIG. 6 in the user's field of view.

Therefore, the user sees the dinosaur 403 fixed at a predetermined position in the field of view (following the movement of the field of view), and the window 402 fixed at a predetermined position in the real space (fixed with respect to the real space). Furthermore, the user sees the dinosaur 403 as if popping out of the window 402. Moreover, the user sees the dinosaur 403 moving from near (for example, the palm 401) to far (for example, a background (not illustrated) of the dinosaur 403 in FIG. 7).

Here, if both the dinosaur 403 located far away and the window 402 located near are in focus even though the dinosaur 403 has moved from near to far, the perspective of the user is disturbed, and the user may feel uncomfortable. Therefore, for example, the image processing unit 321 intentionally blurs the window 402. As a result, the user feels the movement of the dinosaur 403 more naturally.

Note that, when the user returns the field of view to the state of FIG. 6, the image processing unit 321 returns the dinosaur 403 to the window 402, for example, and focuses on both the window 402 and the dinosaur 403.

Furthermore, for example, in the state of FIG. 7, in a case where the user directs the line-of-sight toward the window 402, the image processing unit 321 focuses on the window 402 and blurs the dinosaur 403. That is, visual information in a line-of-sight direction of the user is focused, and other visual information is blurred.

Note that, in a case where the line-of-sight of the user is not directed to any visual information, all the visual information may be blurred. As a result, for example, it is possible to prevent visual information from being constantly in focus within the user's field of view, and it is possible to reduce fatigue of the user's eyes.

Furthermore, for example, a content (a content of visual information) displayed in the window 402 may be changed on the basis of a movement of at least one of the head or the line-of-sight of the user.

For example, in a case where details of the content is represented in a hierarchical structure, a content of a lower hierarchy may displayed in the window 402 in a case where the head or the line-of-sight of the user moves downward, while a content of an upper hierarchy may be displayed in the window 402 in a case where the head or the line-of-sight of the user moves upward.

Moreover, for example, the content in the window 402 may be scrolled in a direction in which the head or the line-of-sight of the user moves.

Thereafter, the process proceeds to step S5.

Whereas, in a case where it is determined in step S3 that the user's field of view and line-of-sight have not moved, the process of step S4 is skipped, and the process proceeds to step S5.

In step S5, the display device 101 determines whether or not a movement of the window has been instructed. For example, in a case where a gesture of the user is recognized by a process similar to step S1, and the recognized gesture coincides with a gesture instructing to move the window, it is determined that a movement of the window has been instructed, and the process proceeds to step S6.

In step S6, the display device 101 moves a position of the window. That is, the display unit 116 stops displaying the window under the control of the visual information control unit 314. As a result, for example, in the example of FIG. 6, the window 402 moves following the movement of the palm 401 or moves to a position where a gesture instructing to display the window is recognized.

Thereafter, the process proceeds to step S7.

Whereas, in a case where it is determined in step S5 that a movement of the window has not been instructed, the process of step S6 is skipped and the process proceeds to step S7.

In step S7, the display device 101 determines whether or not deletion of the window has been instructed. For example, in a case where a gesture of the user is recognized by a process similar to step S1 and the recognized gesture coincides with a gesture instructing to delete the window, it is determined that deletion of the window has been instructed, and the process proceeds to step S8.

In step S8, the display device 101 deletes the window. That is, the display unit 116 stops displaying the window under the control of the visual information control unit 314. As a result, the window is deleted from the user's field of view.

Thereafter, the process returns to step S1, and the processes in and after step S1 are executed.

Whereas, in a case where it is determined in step S7 that deletion of the window has not been instructed, the process returns to step S1, and the processes in and after step S1 are executed.

As described above, the user can display the window at a desired position or move the window, by a simple hand movement. Furthermore, by causing a part of visual information to follow a movement of the user's field of view, visibility of the visual information is improved. Moreover, by focusing on visual information in a line-of-sight direction of the user and blurring other visual information, it is possible to implement natural AR with excellent visibility without disturbing perspective of the user.

<Auditory Perception Support Process>

Figure 8:
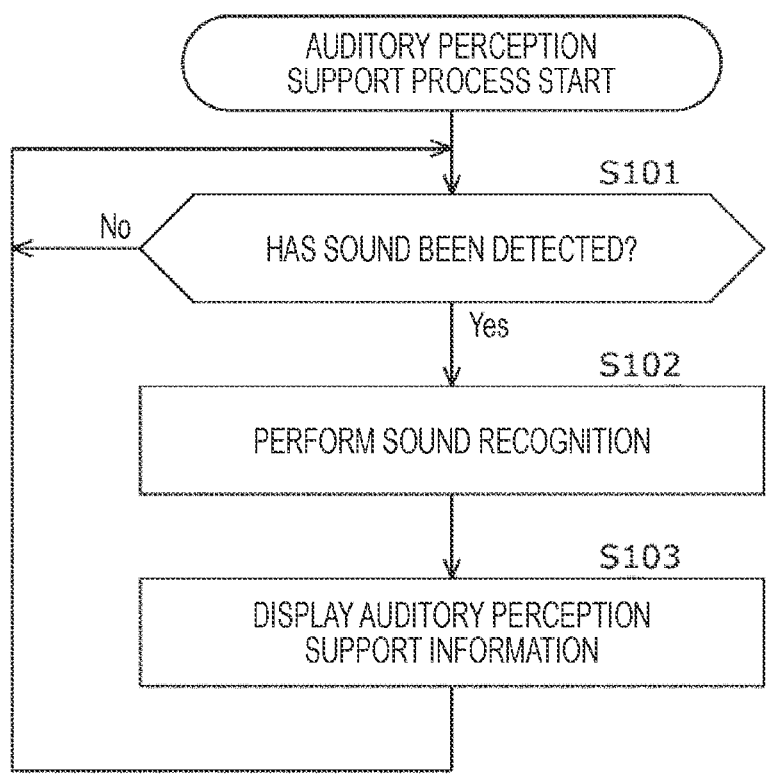
FIG. 8 is a flowchart for explaining an auditory perception support process.

Next, an auditory perception support process executed by the display device 101 will be described with reference to a flowchart in FIG. 8.

The auditory perception support process is, for example, a process of supporting perception of auditory information by using visual information for a user having auditory abnormalities.

This process is started when power of the display device 101 is turned on, and is ended when the power is turned off, for example.

In step S101, the sound recognition unit 312 determines whether or not sound has been detected on the basis of sound data supplied from the sound detection unit 113. This determination process is repeatedly executed until it is determined that sound has been detected, and the process proceeds to step S102 in a case where it is determined that sound has been detected.

In step S102, the sound recognition unit 312 performs sound recognition. Specifically, the sound recognition unit 312 performs a sound recognition process on sound data supplied from the sound detection unit 113, and recognizes a relative position of a sound source, from which the sound is emitted, with respect to the user. Furthermore, the sound recognition unit 312 recognizes a state such as a type, a volume, a pitch, a tone, and sound quality of the sound. Furthermore, in a case where the type of sound is person's voice, the sound recognition unit 312 recognizes utterance contents.

In step S103, the display device 101 displays auditory perception support information. Specifically, the image processing unit 321 generates a visual information image including auditory perception support information that is visual information regarding sound emitted from a sound source around the user. The display control unit 322 supplies the visual information image data to the display unit 116, and controls the projection system 201 to display the auditory perception support information in accordance with a position of the sound source, in the field of view of the user.

Thereafter, the process returns to step S101, and the processes in and after step S101 are executed.

Figure 9:
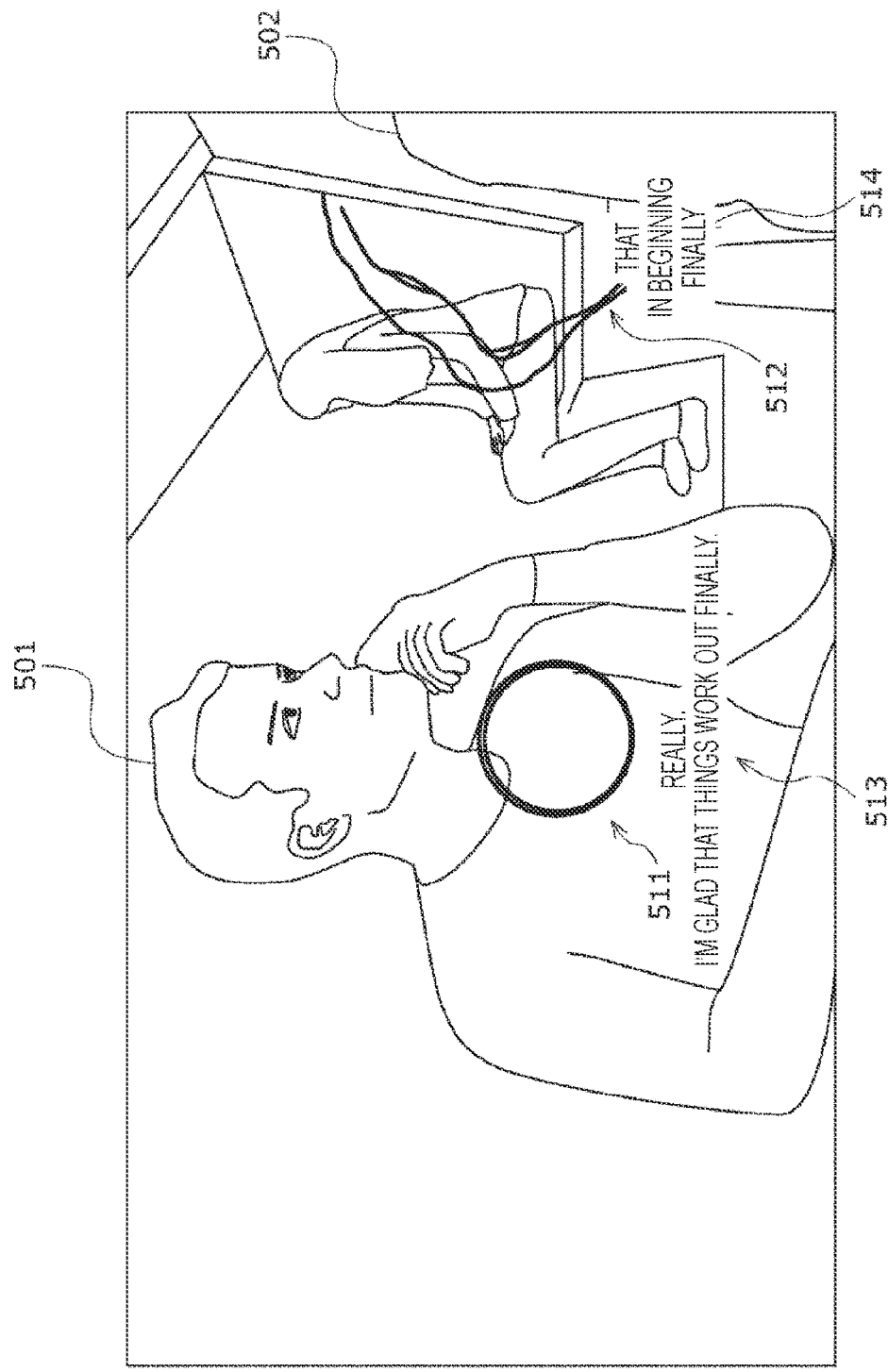
FIG. 9 is a view illustrating a display example of auditory perception support information.

FIG. 9 illustrates a display example of the auditory perception support information.

In this example, a person 501 and a person 502 in the user's field of view are talking. Note that only a part of an arm of the person 502 is included in the field of view of the user, and the face is not shown. Furthermore, sound state information 511, which is visual information indicating a recognized state of voice of the person 501, is displayed in superimposition with the person 501. Moreover, utterance information 512, which is visual information indicating utterance contents of the person 501, is displayed below the sound state information 511. Furthermore, sound state information 513 indicating a recognized state of voice of the person 502 is displayed immediately to the left of the person 502. Moreover, utterance information 514 indicating utterance contents of the person 502 is displayed below the sound state information 513.

The sound state information 511 and the sound state information 513 visually express the sound state by a waveform shape, size, number, color, line thickness, and the like.

FIGS. 10A, 10B, 10C, 11A, 11B, 12A, and to 12B illustrate expression examples of sound state information.

Figure 10A:
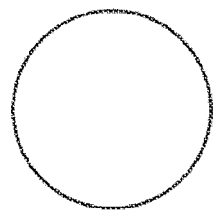
FIGS. 10A, 10B, and 10C are views illustrating a display example of sound state information.
Figure 10B:
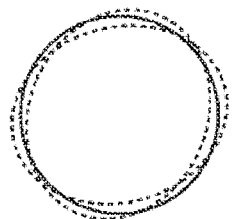
Figure 10C:
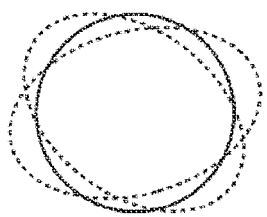

FIGS. 10A, 10B, and 10C illustrate an expression example of sound state information for a volume. FIG. 10A illustrates an example of sound state information in a case of silence, FIG. 10B illustrates an example of sound state information for normal small sound, and FIG. 10C illustrates an example of sound state information for normal large sound. In this example, in the case of silence, the sound state information is represented by one circle (hereinafter, referred to as a basic circle). Whereas, in a case of not silence, a plurality of curves representing the volume is superimposed on the basic circle. Furthermore, as the volume becomes larger, a curve distortion (amplitude) becomes larger.

Figure 11A:
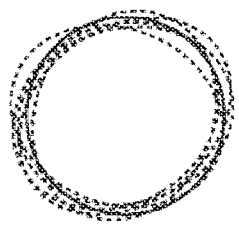
FIGS. 11A and 11B are views illustrating a display example of sound state information.
Figure 11B:
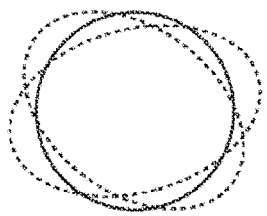

FIGS. 11A and 11B illustrate an expression example of sound state information for the number of pieces of sound included in sound. FIG. 11A illustrates an example of sound state information for sound including many pieces of sound, and FIG. 11B illustrates an example of sound state information including only one piece of sound. In this example, as the number of pieces of sound increases, the number of curves superimposed on the basic circle increases.

Note that, as the sound including many pieces of sound, for example, cases are assumed where many people are talking at the same place, where sound of many instruments is included, and the like.

Figure 12A:
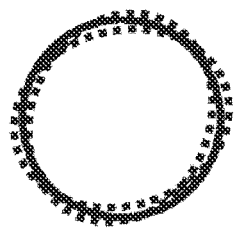
FIGS. 12A and 12B are views illustrating a display example of sound state information.
Figure 12B:
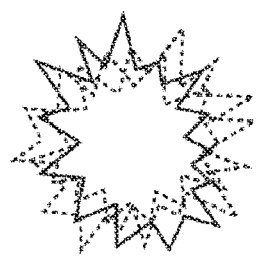

FIGS. 12A and 12B illustrate an example of sound state information for a sound pitch. FIG. 12A illustrates an example of sound state information for low-pitched sound, and FIG. 12B illustrates an example of sound state information for high-pitched sound. In this example, as a pitch of the sound becomes lower, a curve representing the sound state information becomes thicker. Furthermore, as a pitch of the sound becomes higher, a curve representing the sound state information changes drastically.

Furthermore, in a case where the sound is person's voice, for example, the sound state information may represent a feeling recognized from the person's voice. For example, a color of a curve representing the sound state information is set to green for gentle voice, the color of the curve representing the sound state information is set to blue for sad voice, and the color of the curve representing the sound state information is set to red for angry voice.

As described above, for example, a user having auditory abnormalities can perceive more detailed and accurate auditory information. For example, the user can recognize utterance contents of the person 501 and the person 502 from the utterance information 512 and the utterance information 514. Furthermore, the user can recognize a position of a sound source of each piece of voice, that is, a position of a subject of each conversation, on the basis of positions of the sound state information 511 and the utterance information 512, and the sound state information 513 and the utterance information 514. Moreover, by using the sound state information 511 and the sound state information 513, the user can recognize a state of voice that cannot be recognized only with the utterance information 512 and the utterance information 514.

Note that a display position of the sound state information does not necessarily need to be accurately matched with the position of the sound source, and may be matched to an extent to allow a direction of the sound source to be roughly known. Furthermore, the display position of the sound state information does not need to correspond to a position of the sound source in an up-down direction but may correspond only to a position in a left-right direction.

<Virtual Display Displaying Process>

Next, a virtual display displaying process executed by the display device 101 will be described with reference to a flowchart of FIG. 13.

This process is started when power of the display device 101 is turned on, and is ended when the power is turned off, for example.

In step S201, the space recognition unit 311 determines whether or not a keyboard has been detected. This determination process is repeatedly executed until the space recognition unit 311 determines that the keyboard has been detected, and the process proceeds to step S202 in a case where the space recognition unit 311 determines that the keyboard has been detected.

In step S202, the display device 101 displays a virtual display in accordance with a position of the keyboard.

Specifically, the image processing unit 321 generates a visual information image including a virtual display, which is one of visual information. The display control unit 322 supplies visual information image data to the display unit 116, and controls the display unit 116 to display the virtual display in accordance with the position of the keyboard, in the field of view of the user.

Figure 14:
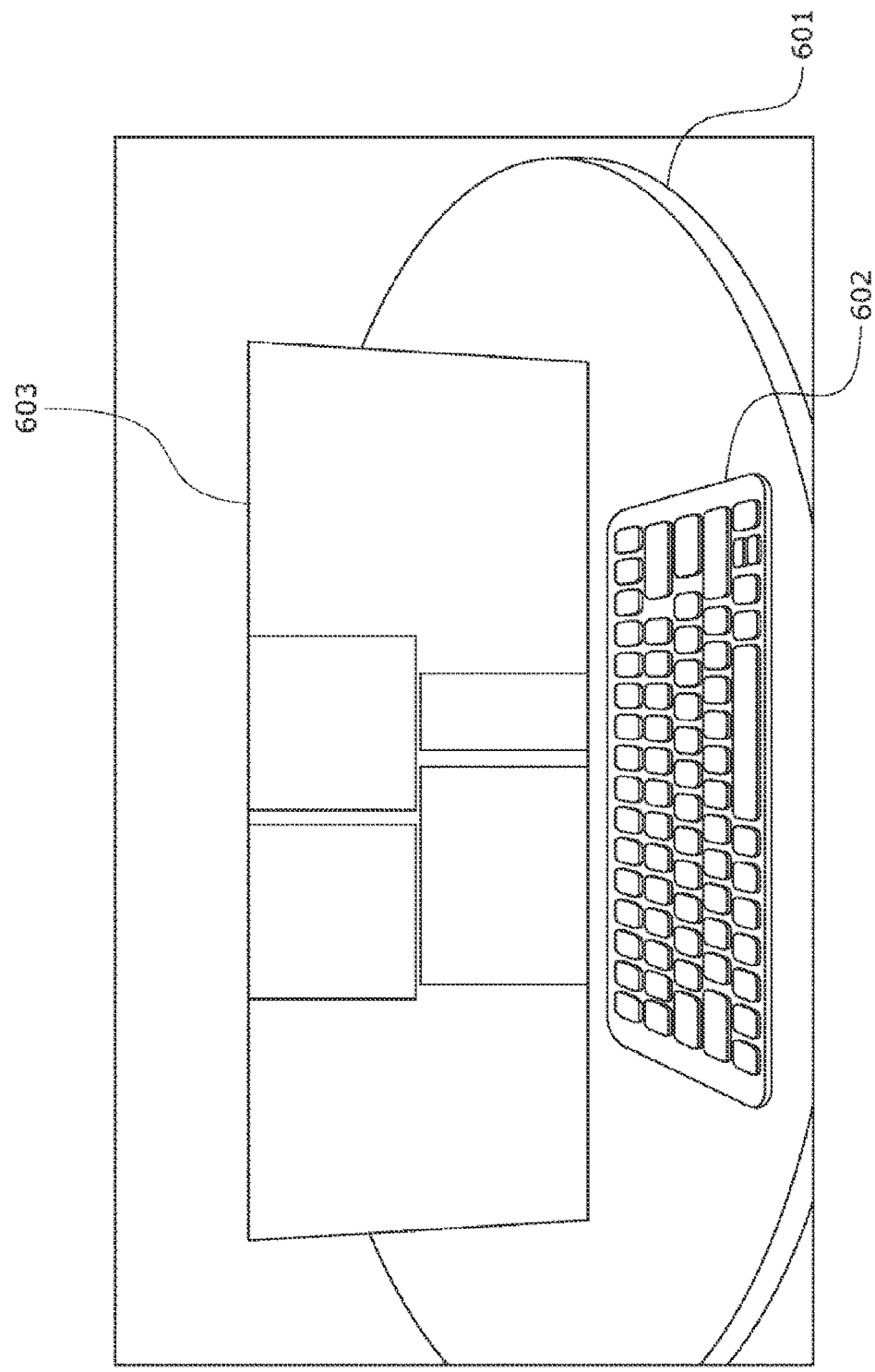
FIG. 14 is a view illustrating a display example of a virtual display.

FIG. 14 illustrates a display example of a virtual display 603.

In this example, a keyboard 602 is placed on a desk 601 in a real space in the user's field of view. No information is printed on a key top of each key of the keyboard 602.

The display control unit 322 sets a display position of the virtual display 603 on the basis of feature points (for example, four corners of the keyboard 602 and the like) of the keyboard 602 recognized by the space recognition unit 311. For example, the display position of the virtual display 603 is set to a position at which the user can easily view while using the keyboard 602. Then, the display control unit 322 controls the display unit 116 to display the virtual display 603 at the set display position in the field of view of the user.

Note that, for example, the image processing unit 321 may generate a visual information image in which a periphery of the virtual display 603 is blurred. As a result, in the user's field of view, the vicinity of a boundary of the virtual display 603 with a real world is blurred. Then, the user receives an impression that the virtual display 603 is spatially wider than the actual size, and is prevented from receiving an illusion that information has disappeared near the boundary of the virtual display 603. As a result, visibility and workability of the user are improved.

In step S203, the display control unit 322 determines whether or not displaying of a key top is set to a variable mode. In a case where it is determined that displaying of a key top is set to the variable mode, the process proceeds to step S204.

Here, the variable mode is a mode in which information displayed on a key top of each key of the keyboard changes in accordance with a situation.

In step S204, the space recognition unit 311 determines whether or not a finger has approached a key top. In a case where it is determined that the finger has approached a key top, the process proceeds to step S205.

In step S205, the display device 101 displays the key top.

Specifically, the image processing unit 321 generates a visual information image including visual information to be displayed on the key top, as operation support information for support of the operation of the keyboard. The display control unit 322 supplies the visual information image data to the display unit 116, and controls the display unit 116 to display the visual information on a key top of each key of the keyboard in the field of view of the user.

At this time, the visual information displayed on the key top changes in accordance with a situation. For example, the visual information displayed on the key top changes in accordance with information displayed on the virtual display or a function being operated. For example, a character or a symbol assigned to each key, a name or an icon of a function assigned to each key, or the like is displayed on the key top of each key in the field of view of the user.

Furthermore, it is not always necessary to display visual information on all the keys of the keyboard. For example, the visual information may be displayed only on a key top of a key to which the user's finger approaches and keys around the key.

Thereafter, the process proceeds to step S207.

Whereas, in a case where it is determined in step S204 that a finger has not approached a key top, the process of step S205 is skipped, and the process proceeds to step S207.

Furthermore, in a case where it is determined in step S203 that displaying of a key top is set to a fixed mode, the process proceeds to step S206.

Here, the fixed mode is a mode in which information displayed on a key top of each key of the keyboard is fixed without changing in accordance with a situation.

In step S206, the key top is displayed similarly to the process of step S205.

At this time, the visual information displayed on the key top of each key is fixed. For example, a character or a symbol printed on a key top of each key of a commercially available keyboard is displayed on the key top of each key in the field of view of the user.

Thereafter, the process proceeds to step S207.

In step S207, the space recognition unit 311 determines whether or not a key top is hidden by a hand. In a case where there is a key whose key top is invisible by the user's hand among the keys of the keyboard in the user's field of view, the space recognition unit 311 determines that a key top is hidden by the hand, and the process proceeds to step S208.

In step S208, the display device 101 displays visual information of the hidden portion of the key top in superimposition with the hand.

Specifically, the image processing unit 321 generates a visual information image including visual information for a key for which visual information needs to be displayed, among keys whose key tops are invisible by the user's hand in the user's field of view. The display control unit 322 supplies visual information image data to the display unit 116, and controls the display unit 116 to display the visual information for the key whose key top is hidden, to be superimposed on the hand of the user in the field of view of the user.

Figure 15:
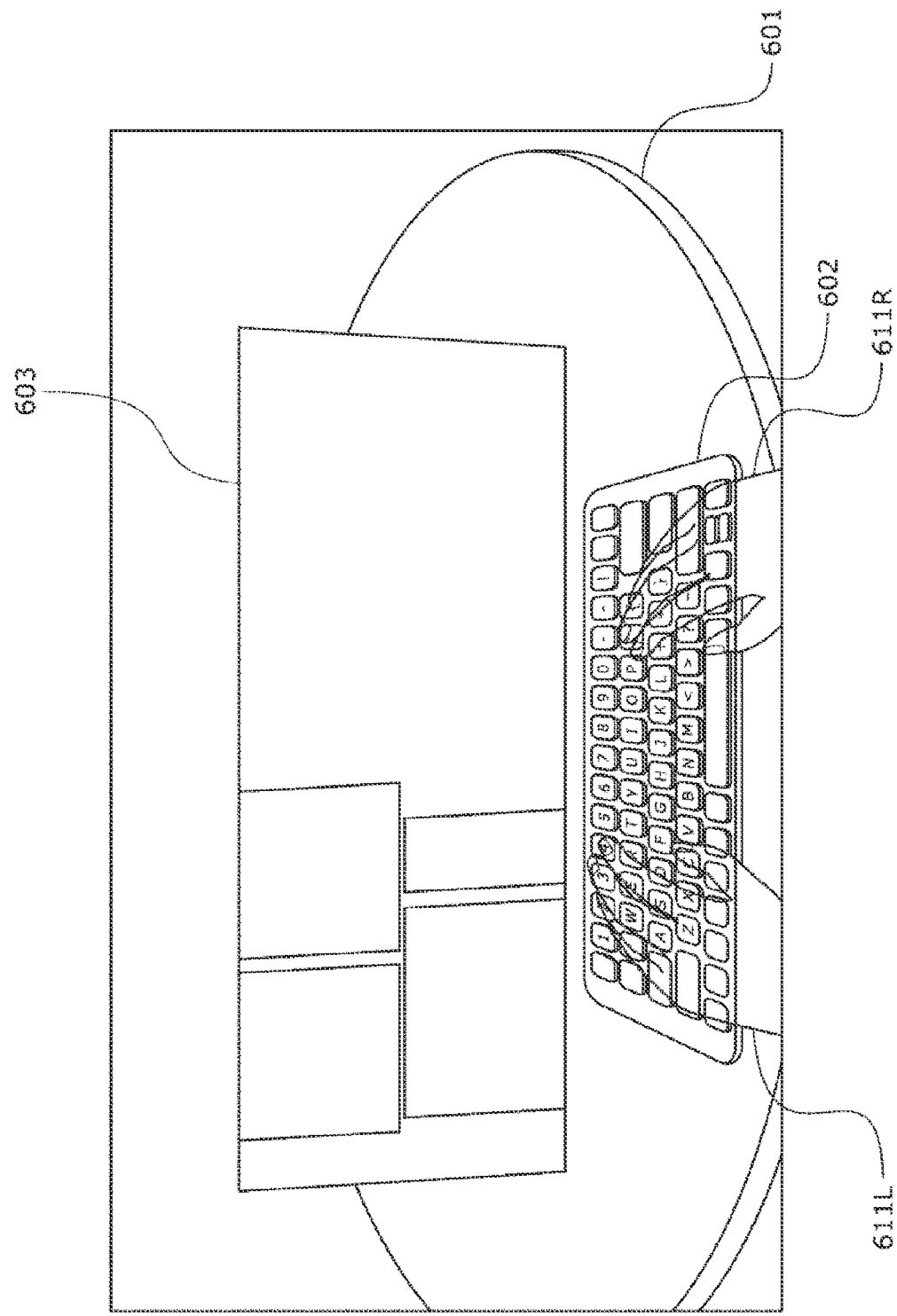
FIG. 15 is a view illustrating a display example of a key top of a keyboard.

FIG. 15 illustrates an example in which visual information of a key top is displayed in superimposition with the hand of the user. In this example, some keys of the keyboard 602 are hidden by a left hand 611L and a right hand 611R of the user. Then, visual information for a key top of the hidden key is displayed in superimposition on the left hand 611L and the right hand 611R. In this example, characters printed on key tops and outer frames of keys of commercially available keyboard are displayed in superimposition with the left hand 611L and the right hand 611R.

Note that, for example, visual information for a key pressed by the user may be displayed separately from visual information for other keys. For example, in a case a key with a character "4" illustrated in FIG. 15 as visual information is pressed, visual information for the key may be displayed in a different mode (for example, in a different color and the like) from visual information for other keys.

Thereafter, the process returns to step S201, and the processes in and after step S201 are executed.

Whereas, in a case where it is determined in step S207 that the key top is not hidden by the hand, the process returns to step S201, and the processes in and after step S201 are executed.

In this way, for example, by simply placing the keyboard 602 in the field of view, the virtual display 603 is displayed at an appropriate position in the field of view, and the user can perform work or the like by using the keyboard 602 and the virtual display 603.

Furthermore, the virtual display 603 does not occupy a physical space. Therefore, for example, the user can carry the keyboard 602 and easily perform work at any place as long as there is a space where the keyboard 602 can be placed. Moreover, since the virtual display 603 is visible only to the user and is invisible to others, for example, the user can perform highly confidential work even in a public place.

<Visual Information Sharing Process>

Figure 16:
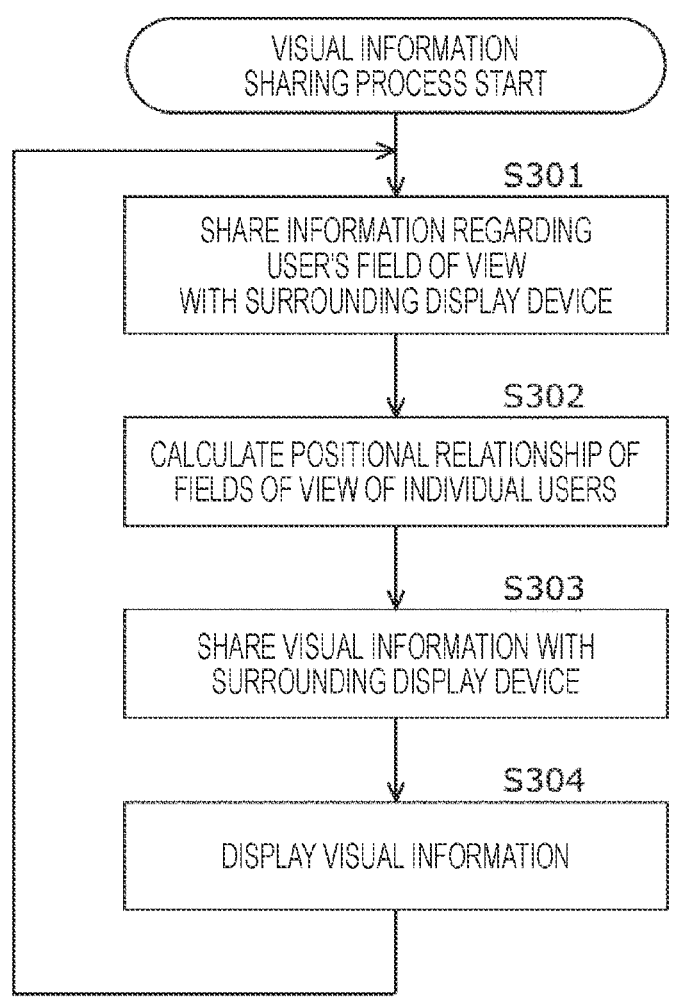
FIG. 16 is a flowchart for explaining a visual information sharing process.

Next, a visual information sharing process executed by the display device 101 will be described with reference to a flowchart in FIG. 16.

This process is started when power of the display device 101 is turned on, and is ended when the power is turned off, for example.

In step S301, the display device 101 shares information regarding the user's field of view with a surrounding display device. Specifically, the communication unit 118 transmits information regarding the user's field of view to the surrounding display device under control of the communication control unit 317. Furthermore, under the control of the communication control unit 317, the communication unit 118 receives information regarding a field of view of a user of the surrounding display device, from the surrounding display device.

The information regarding the user's field of view includes, for example, captured image data of a range including the user's field of view of and sensor data indicating an acceleration, an angular velocity, and a current position of the display device.

Note that, hereinafter, in a case where the user of the display device 101 and the user of the surrounding display device are distinguished, the former is referred to as an own user, and the latter is referred to as another user.

In step S302, the sharing control unit 323 calculates a positional relationship of fields of view of individual users. Specifically, the sharing control unit 323 calculates a range of a field of view of the own user in a real world on the basis of a captured image, an acceleration, an angular velocity, and a current position of the display device 101. Furthermore, the sharing control unit 323 calculates a range of a field of view of another user in the real world on the basis of a captured image, an acceleration, an angular velocity, and a current position of the surrounding display device. Moreover, on the basis of the range of the field of view of the own user and the range of the field of view of another user, the sharing control unit 323 calculates a shared region in which fields of view overlap between the users.

Figure 17:
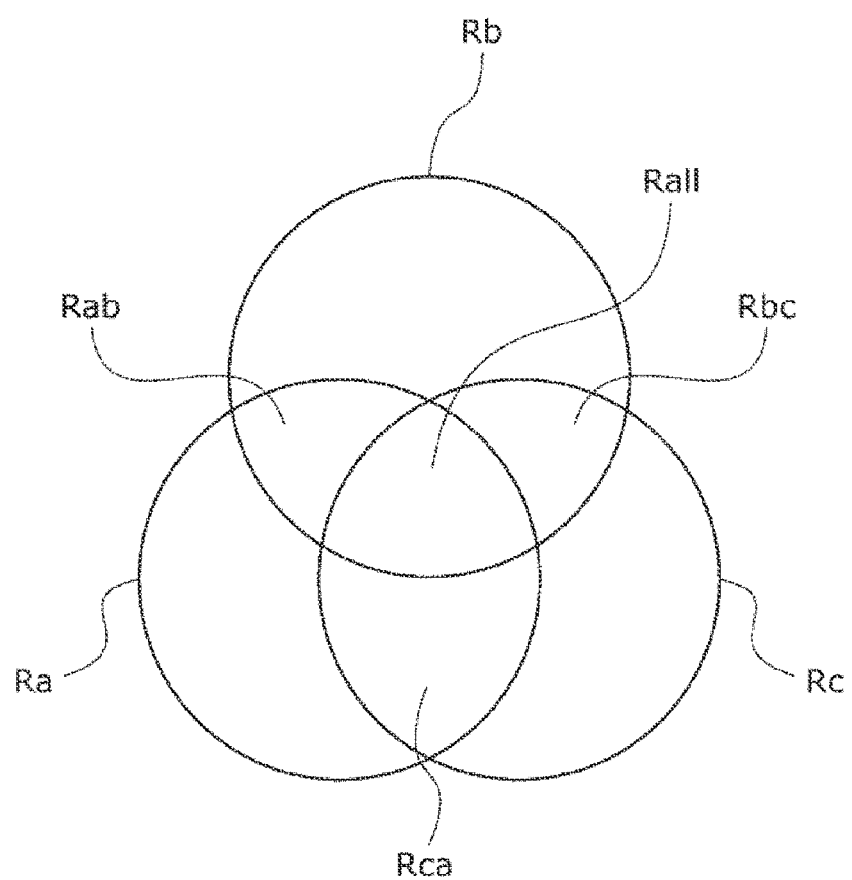
FIG. 17 is a schematic view illustrating an example of a range of a field of view of each user.

FIG. 17 schematically illustrates a range of a field of view of each user. A region Ra indicates a range of a field of view of a user A who is a user (own user) of the display device 101. A region Rb indicates a range of a field of view of a user B of a surrounding display device B. A region Rc indicates a range of a field of view of a user C of a surrounding display device C.

Therefore, a shared region Rall in which the region Ra, the region Rb, and the region Rc overlap is a region in which the fields of view of the users A to C overlap. A shared region Rab in which only the region Ra and the region Rb overlap is a region in which the fields of view of the user A and the user B overlap. A shared region Rbc in which only the region Rb and the region Rc overlap is a region in which the fields of view of the user B and the user C overlap. A shared region Rca in which only the region Rc and the region Ra overlap is a region in which the fields of view of the user C and the user A overlap.

In step S303, the display device 101 shares visual information with a surrounding display device. Specifically, the sharing control unit 323 generates visual information shared data including image data for displaying visual information existing within a field of view of another user among visual information displayed by the display device 101, and including a display position of the visual information in a real world. The display position of the visual information in the real world indicates a position where the visual information is displayed in superimposition in the real world in the field of view of the own user. The communication unit 118 transmits the visual information shared data to the surrounding display device under the control of the communication control unit 317.

Furthermore, the communication unit 118 receives similar visual information shared data from the surrounding display device under the control of the communication control unit 317.

For example, in a case of the example of FIG. 17, among visual information virtually displayed in the region Ra, the display device 101 used by the user A (own user) transmits, to the display device B, visual information shared data related to visual information virtually displayed in the shared region Rall and the shared region Rab. Furthermore, among visual information virtually displayed in the region Ra, the display device 101 transmits, to the display device C, visual information shared data related to visual information virtually displayed in the shared region Rall and the shared region Rca.

Moreover, among visual information virtually displayed in the region Rb by the display device B, the display device 101 receives, from the display device B, visual information shared data related to visual information virtually displayed in the shared region Rall and the shared region Rab. Furthermore, among visual information virtually displayed in the region Rc by the display device C, the display device 101 receives, from the display device C, visual information shared data related to visual information virtually displayed in the shared region Rall and the shared region Rca.

Note that, hereinafter, in a case where visual information displayed by the display device 101 and visual information displayed by the surrounding display device are distinguished, the former is referred to as original visual information, and the latter is referred to as surrounding visual information.

In step S304, the display device 101 displays visual information.

Specifically, the image processing unit 321 generates a visual information image including the original visual information and the surrounding visual information. The display control unit 322 supplies the visual information image data to the display unit 116, and controls the display unit 116 to display the original visual information and the surrounding visual information in the user's field of view.

Thereafter, the process returns to step S301, and the processes in and after step S301 are executed.

Figure 18:
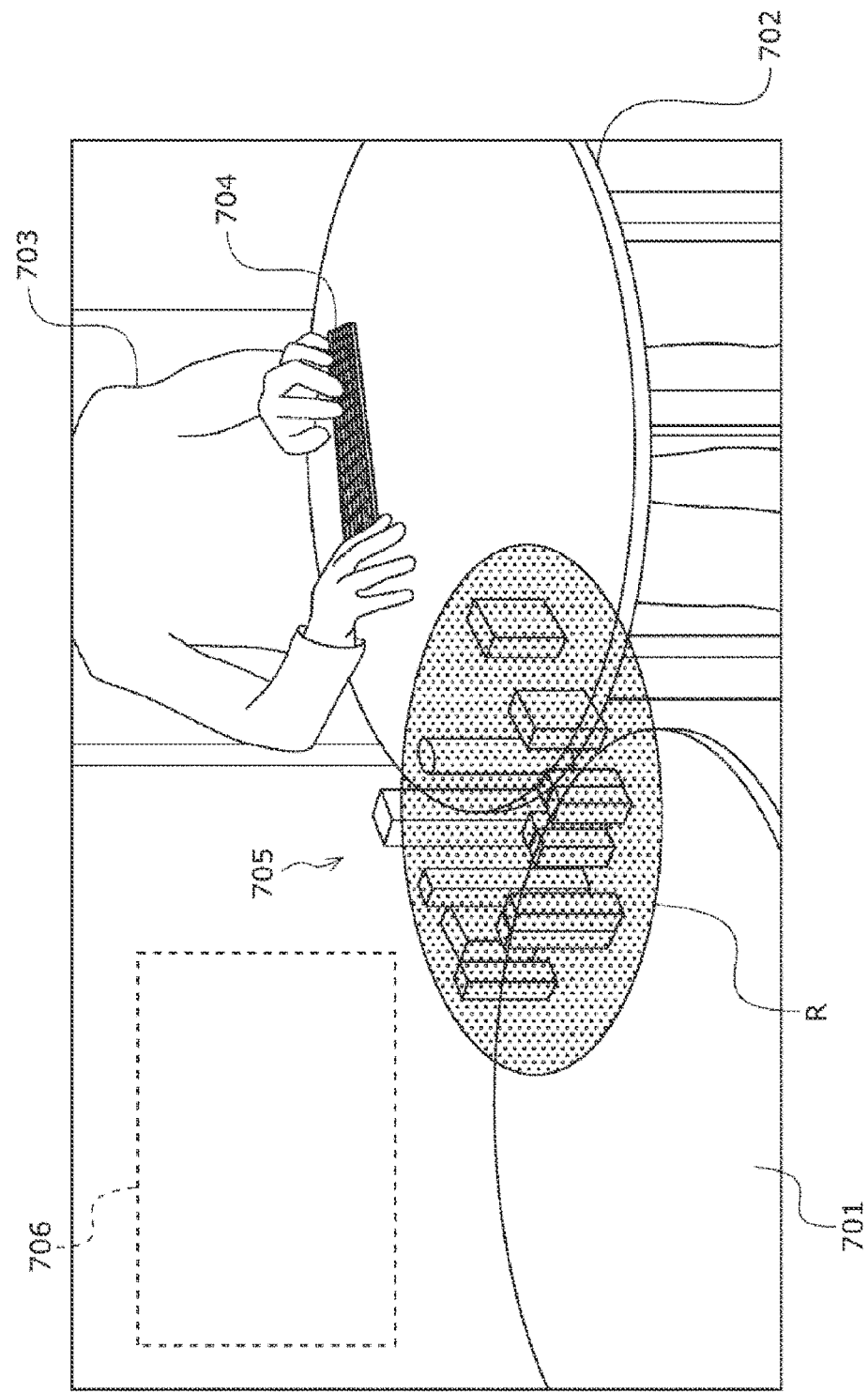
FIG. 18 is a view for explaining a visual information sharing method.

FIG. 18 schematically illustrates a state of a field of view of the own user of the display device 101. A desk 701 and a desk 702 exist in the field of view of the own user. Furthermore, a user 703 sits on an opposite side of the desk 702, and the user 703 operates a keyboard 704 on the desk 702. Moreover, a building group 705 and a window 706 are displayed as visual information in the field of view of the own user.

Then, the building group 705 in a shared region R is visual information shared between the own user and the user 703. That is, the building group 705 is viewed from different directions by the own user and the user 703 via the respective display devices.

As a result, for example, the own user and the user 703 can have a conversation or the like while viewing the virtual building group 705 that does not exist in a real world.

Whereas, only the own user can see the window 706. Therefore, the own user can perform various kinds of work by using the window 706 without being seen by surrounding users.

Note that, the window 706 is shifted to the left from the line-of-sight direction of the own user, and thus may be blurred.

Here, in order to clearly recognize the shared region, for example, it is desirable to individually display visual information indicating the shared region R in FIG. 18 in the field of view of the own user and the user 703.

Figure 19:
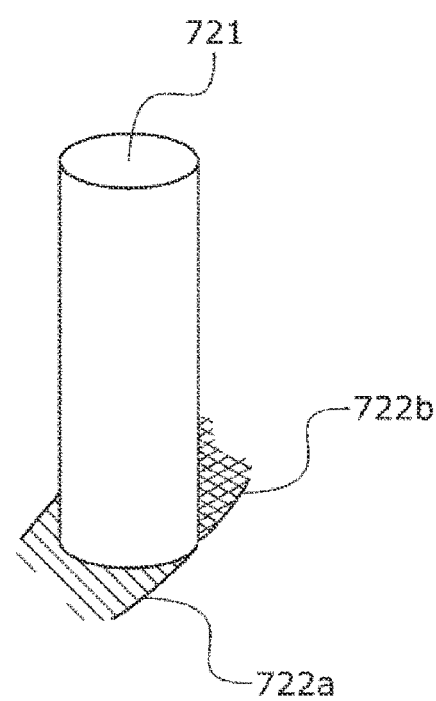
FIG. 19 is a view illustrating a display example of a viewer of visual information.

Furthermore, for example, as illustrated in FIG. 19, it is also possible to indicate which user can see each piece of visual information.

For example, FIG. 19 illustrates a display example of visual information 721 in the field of view of the own user. In this example, a shadow 722a and a shadow 722b, which are visual information indicating users who share the visual information 721, that is, users (hereinafter, referred to as viewers) viewing the visual information 721, are displayed as shadows of the visual information 721. For example, the shadow 722a extends in a direction of the own user (the display device 101), and the shadow 722b extends in a direction of (a display device of) another user with which the visual information 721 is shared.

Note that patterns (for example, a color, a design, and the like) of the shadow 722a and the shadow 722b are distinguished so that the corresponding users can be identified. Furthermore, in order to enable unique identification of each user in a case where a plurality of pieces of visual information is shared, shadow patterns are distinguished for each user, and shadow patterns for the same user are unified.

Figure 20:
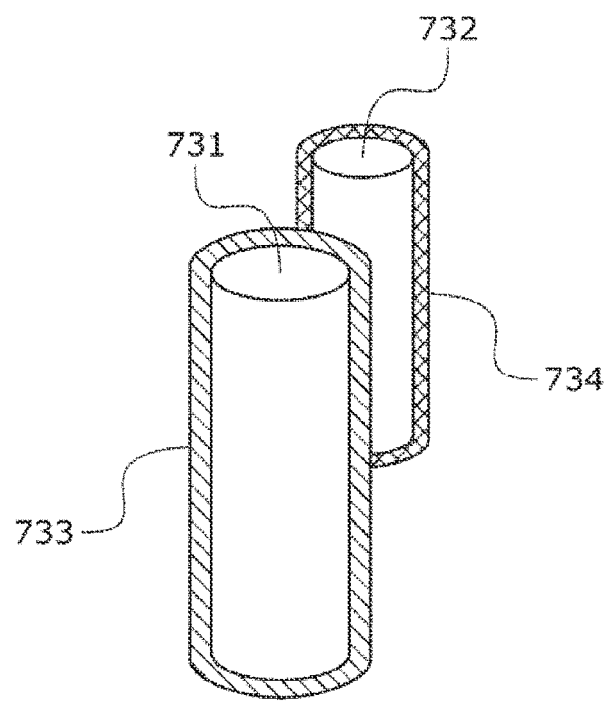
FIG. 20 is a view illustrating a display example of an owner of visual information.

Moreover, for example, as illustrated in FIG. 20, visual information indicating an owner of each piece of visual information may be displayed. The owner of the visual information is a user of a display device displaying original visual information. Therefore, among viewers of certain visual information, the owner views original visual information corresponding to the visual information, and the users other than the owner view shared visual information corresponding to the visual information.

For example, FIG. 20 illustrates a display example of visual information 731 and visual information 732 in a field of view of the own user. Note that the visual information 731 is original visual information, and the visual information 732 is surrounding visual information.

In this example, glitter 733, which is visual information for identifying an own user who is the owner of the visual information 731, is displayed around the visual information 731. Furthermore, glitter 734 for identifying another user who is the owner of the visual information 732 is displayed around the visual information 732.

Note that the glitter 733 and the glitter 734 are distinguished in pattern so that the owner can be identified. Furthermore, in order to enable unique identification of the owner of each piece of visual information, the glitter patterns are distinguished for each user, and the glitter patterns of the same owner are unified.

As described above, the visual information can be shared between the users.

Note that each user can individually move a position of the original visual information by a predetermined operation. Whereas, each user cannot move a position of the shared visual information. Therefore, each user can supply the original visual information with another user or cancel sharing with another user, by moving the position of the original visual information. Furthermore, each user can select a user with which the original visual information is shared, by moving the position of the original visual information.

<Equipment Control Process>

Figure 21:
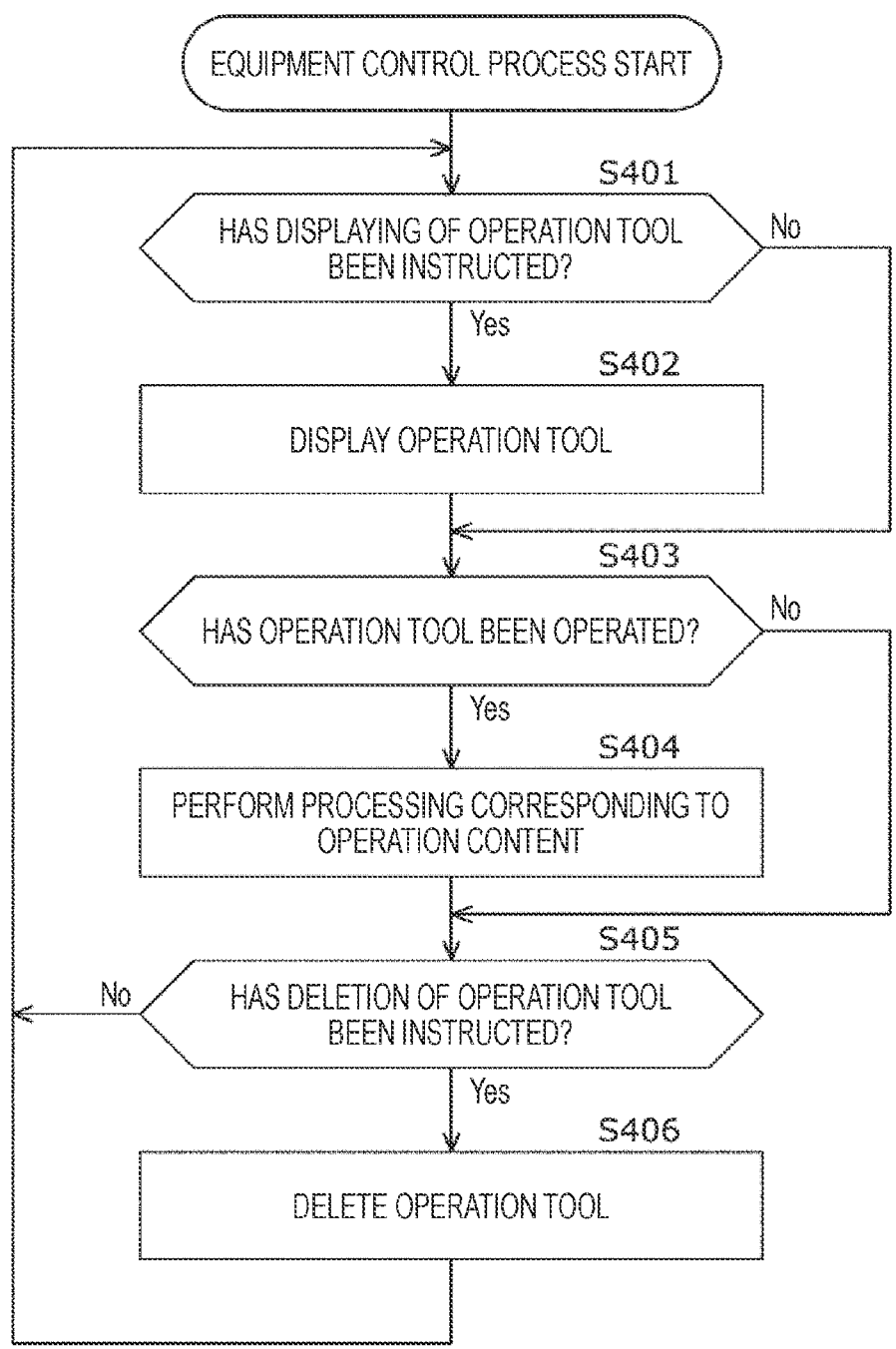
FIG. 21 is a flowchart for explaining an equipment control process.

Next, an equipment control process executed by the display device 101 will be described with reference to a flowchart in FIG. 21.

This process is started when power of the display device 101 is turned on, and is ended when the power is turned off, for example.

In step S401, the display device 101 determines whether or not displaying of an operation tool has been instructed. For example, in a case where a gesture of the user is recognized by a process similar to step S1 in FIG. 5 and the recognized gesture coincides with a gesture instructing to display the operation tool, it is determined that displaying of the operation tool has been instructed, and the process proceeds to step S2.

In step S402, the display device 101 displays the operation tool.

Specifically, the image processing unit 321 generates a visual information image including the operation tool, which is one of visual information. The display control unit 322 supplies the visual information image data to the display unit 116, and controls the display unit 116 to display a virtual operation tool in the field of view of the user.

Note that the operation tool is displayed, for example, in the field of view of the user so as to overlap with one piece of equipment among pieces of equipment that can be operated by the operation tool or in the vicinity of the one piece of equipment. Then, the equipment becomes an operation target by the operation tool.

Note that, hereinafter, equipment to be operated by the operation tool is referred to as operation target equipment.

Alternatively, the operation tool is displayed at a position designated by the user in the field of view of the user.

Figure 22:
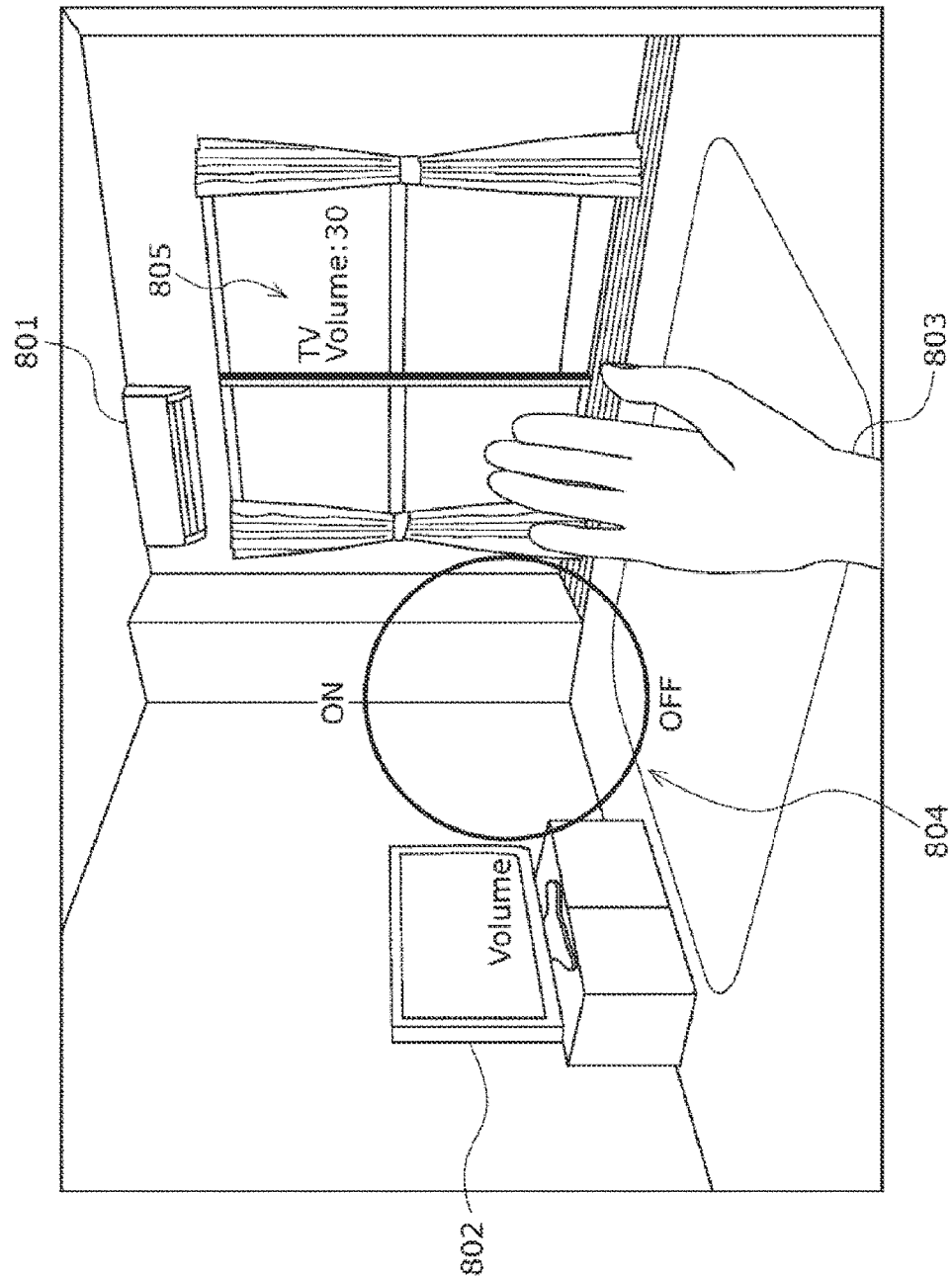
FIG. 22 is a view illustrating a display example of an operation tool.

FIG. 22 illustrates a display example of the operation tool.

In this example, an air conditioner 801 and a TV 802 are present as equipment that can be operated by the operation tool in the user's field of view. Then, when the user stands still for a while with a palm 803 facing upward, an operation tool 804 is displayed on the right side of the TV 802.

The operation tool 804 is semitransparent and circular. This example shows an example in which an operation target of the operation tool 804 is set to the TV 802, and power supply and a volume of the TV 802 can be operated by the operation tool 804. Furthermore, visual information 805 indicating that the operation target equipment is the TV 802 and the volume is set to 30 is displayed on the right side of the field of view.

Figure 23A:
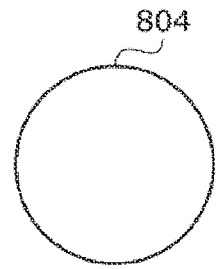
FIGS. 23A, 23B, and 23C are views illustrating a display example of the operation tool.
Figure 23B:
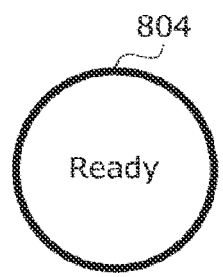
Figure 23C:
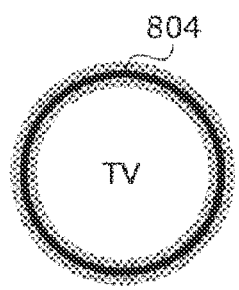

FIGS. 23A, 23B, and 23C illustrate a display example of the operation tool 804 in each state.

FIG. 23A illustrates a display example of the operation tool 804 in a standby state. The standby state is a state in which the operation tool 804 is before being activated and cannot be operated.

FIG. 23B illustrates a display example when the operation tool 804 is activated and becomes operable. In this example, a curve around the operation tool 804 is thicker than that in the standby state, and characters "Ready" are displayed at a center.

FIG. 23C illustrates a display example when the operation tool 804 is superimposed on specific equipment. This example illustrates a display example when the operation tool 804 is superimposed on the TV. As compared with the standby state, a curve of the operation tool 804 becomes thicker, and a display effect is applied around the curve. Furthermore, at a center of the operation tool 804, a name of the equipment on which the operation tool 804 is overlapped and set as the operation target is displayed.

Thereafter, the process proceeds to step S403.

Whereas, in a case where it is determined in step S401 that displaying of the operation tool has not been instructed, the process of step S402 is skipped and the process proceeds to step S403.

In step S403, the operation recognition unit 313 determines whether or not the operation tool has been operated. For example, in a case where a gesture of the user is recognized by a process similar to step S1 in FIG. 5 and the recognized gesture coincides with a gesture indicating an operation on the operation tool, it is determined that the operation tool has been operated, and the process proceeds to step S404.

In step S404, the display device 101 performs processing corresponding to an operation content.

For example, the image processing unit 321 generates a visual information image in which displaying of the operation tool is updated, in accordance with the operation content. The display control unit 322 supplies the visual information image data to the display unit 116, and controls the display unit 116 to display the operation tool at a position corresponding to the operation content in the field of view of the user.

Figure 24A:
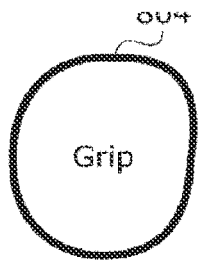
FIGS. 24A, 24B, and 24C are views illustrating a display example of the operation tool.
Figure 24B:
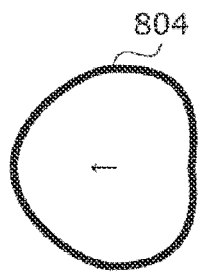
Figure 24C:
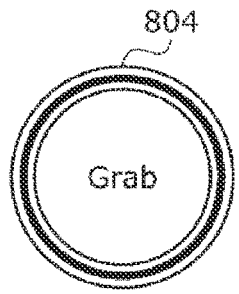

FIGS. 24A, 24B, and 24C illustrates a display example in a case where various operations are performed on the operation tool 804 in FIG. 22.

FIG. 24A illustrates a display example in a case where the operation tool 804 is gripped. In this example, a curve around the operation tool 804 is deformed, and characters "Grip" are displayed at a center.

FIG. 24B illustrates a display example in a case where the operation tool 804 is pressed from the right side. In this example, a curve around the operation tool 804 is distorted in the left direction, and an arrow in the left direction is displayed at a center.

FIG. 24C illustrates a display example in a case where the operation tool 804 is grabbed. In a case of this example, a curve around the operation tool 804 is tripled, and a thick curve is sandwiched between two thin curves. Furthermore, characters "Grab" are displayed at a center. In this state, for example, the user can move a display position of the operation tool by moving a hand that is virtually grabbing the operation tool.

Furthermore, in a case where an operation is performed on the operation target equipment by using the operation tool, the equipment control unit 316 generates a control signal corresponding to the operation content. The communication unit 118 transmits the control signal to the operation target equipment under the control of the communication control unit 317.

Whereas, the operation target equipment performs processing on the basis of the control signal. As a result, the user can operate the operation target equipment by using the operation tool.

Moreover, in a case where the operation tool is superimposed on or brought close to equipment different from the operation target equipment, the equipment control unit 316 changes the operation target equipment to the equipment.

Thereafter, the process proceeds to step S405.

Whereas, in a case where it is determined in step S403 that the operation tool has not been operated, the process of step S404 is skipped and the process proceeds to step S405.

In step S405, the display device 101 determines whether or not deletion of the operation tool has been instructed. For example, in a case where a gesture of the user is recognized by a process similar to step S1 in FIG. 5 and the recognized gesture coincides with a gesture instructing to delete the operation tool, it is determined that deletion of the operation tool has been instructed, and the process proceeds to step S406.

In step S406, the display device 101 deletes the operation tool. That is, the display unit 116 stops displaying the operation tool under the control of the visual information control unit 314. As a result, the operation tool is deleted from the user's field of view.

Thereafter, the process returns to step S401, and the processes in and after step S401 are executed.

Whereas, in a case where it is determined in step S405 that deletion of the operation tool has not been instructed, the process returns to step S401, and the processes in and after step S401 are executed.

As described above, the user can operate various kinds of equipment by operating the operation tool virtually displayed in the field of view.

Furthermore, in a conventional method in which a user visually recognizes visual information displayed on a display in front of both eyes of the user, in order to cause an operation tool to be displayed near the user, it is necessary to display the operation tool at a position close to an inside (on a side between both eyes) of each display. However, when the operation tool is too close to the inside of each display, there is a possibility to cause crossed eyes of the user. Therefore, it is necessary to separate the user and the display position of the operation tool by a predetermined distance or more. Therefore, the user needs to operate the operation tool separated by the predetermined distance or more, and operability is deteriorated.

Whereas, in the retinal direct drawing method, since there is no possibility of crossed eyes, a distance between the user and the display position of the operation tool is not particularly limited. Therefore, the operation tool can be displayed near the user, and operability is improved.

<Visual Information Remote Display Process>

Figure 25:
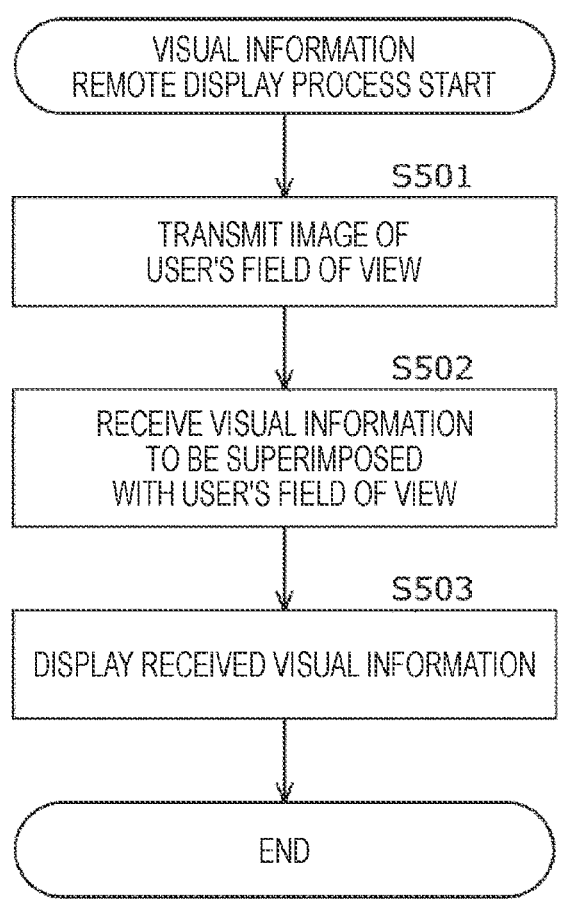
FIG. 25 is a flowchart for explaining a visual information remote display process.

Next, a visual information remote display process executed by the display device 101 will be described with reference to a flowchart in FIG. 25.

The visual information remote display process is a process of externally controlling visual information displayed on the display device 101.

In step S501, the display device 101 transmits an image of a user's field of view. Specifically, the communication unit 118 transmits captured image data supplied from the image capturing unit 112 to an external device under the control of the communication control unit 317.

The external device is not particularly limited. For example, the external device includes a personal computer (PC), a tablet terminal, a smartphone, a mobile phone, a server, and the like. Furthermore, the display device 101 may directly communicate with an external device or may communicate via a network.

In step S502, the display device 101 receives visual information to be superimposed with the user's field of view.

For example, another user (hereinafter, referred to as a remote user) who uses the external device generates visual information to be displayed in a field of view of the user of the display device 101 by using the external device, and specifies a display position of the visual information in a captured image acquired from the display device 101. Then, the external device generates remote visual information data including image data for displaying the visual information and including the display position of the visual information in the captured image, and transmits to the display device 101.

Whereas, the communication unit 118 of the display device 101 receives the remote visual information data under the control of the communication control unit 317.

In step S503, the display device 101 displays the received visual information. Specifically, the image processing unit 321 generates a visual information image including visual information received from the external device. The display control unit 322 supplies the visual information image data to the display unit 116, and controls the display unit 116 to display the visual information received from the external device in the user's field of view. At this time, the display control unit 322 controls a display position of the visual information so as to substantially match the position specified on the captured image, in the field of view of the user.

Thereafter, the visual information remote display process ends.

Figure 26:
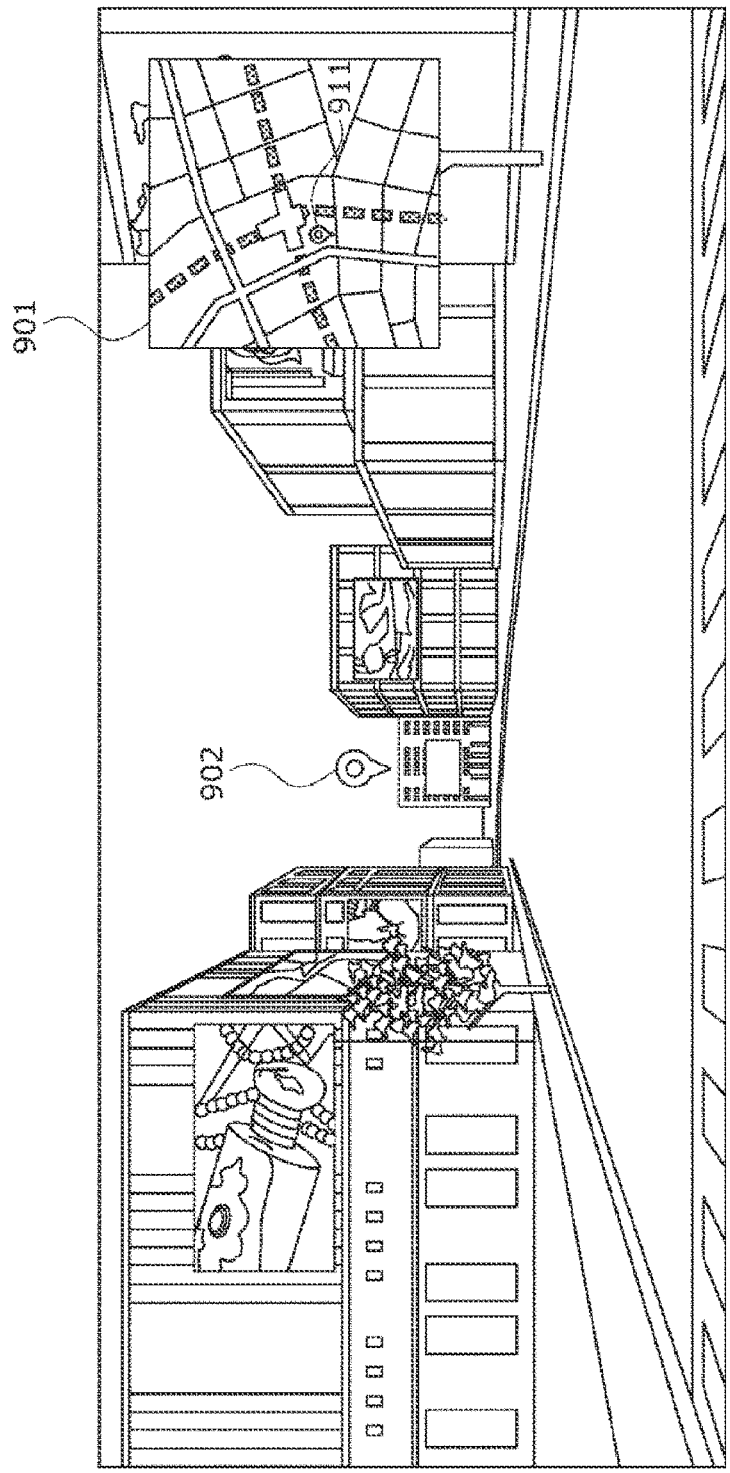
FIG. 26 is a view illustrating an example of remote display of visual information.

FIG. 26 illustrates a display example of visual information in this process.

In this example, there is a town in the user's field of view. Then, a map 901, which is one of visual information, is displayed at an upper left corner in the user's field of view. In the map 901, a pointer 911 indicating a destination is displayed. Furthermore, a pointer 902, which is visual information indicating a destination, is displayed on a central building in the user's field of view.

For example, according to the above-described process, the remote user can control to display the map 901 and the pointer 902 in the field of view of the user of the display device 101 from the external device, indicate destination to the user, and guide the user to the destination.

Note that without limiting to this example, for example, by remotely controlling visual information in the user's field of view, the remote user can give an instruction or provide information to the user from a distance.

2. Modification

Hereinafter, a modification of the above-described embodiment of the present technology will be described.

<Modification Regarding Configuration of System>

In the above description, an example has been described in which the display device 101 independently generates and displays visual information, but for example, the processing by the display device 101 may be shared by a plurality of devices.

Figure 27:
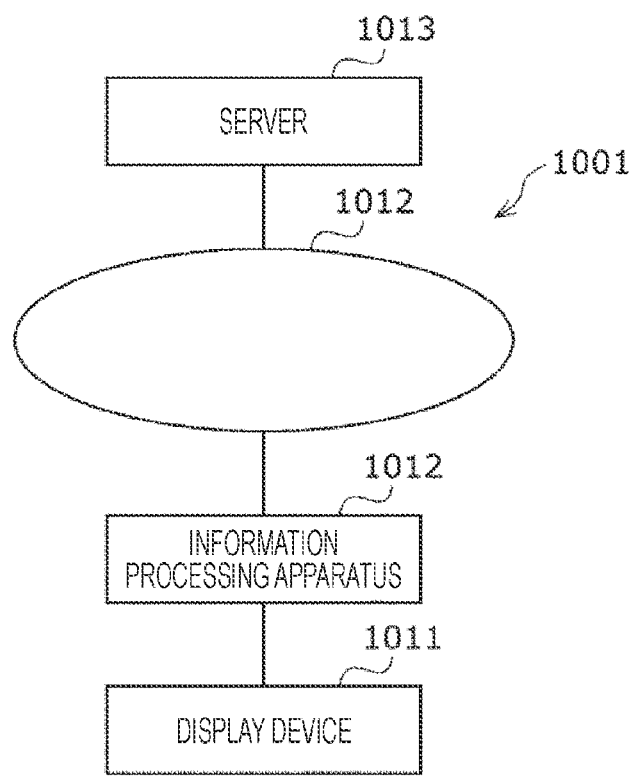
FIG. 27 is a block diagram illustrating a configuration example of a display system to which the present technology is applied.

FIG. 27 illustrates a configuration example of a display system 1001 to which the present technology is applied.

The display system 1001 includes a display device 1011, an information processing apparatus 1012, and a server 1013. The information processing apparatus 1012 and the server 1013 are connected to each other via a network 1021, and can communicate with each other. Furthermore, the display device 1011 and the information processing apparatus 1012 can directly communicate with each other.

The display device 1011 has, for example, at least a function similar to that of the display unit 116 of the display device 101 in FIG. 1, and can display visual information in superimposition within a field of view of a user. Whereas, the display device 1011 does not have a function of generating a visual information image. Then, the display device 1011 receives visual information image data from the information processing apparatus 1012 or from the server 1013 via the network 1021 and the information processing apparatus 1012. Then, the display device 1011 displays visual information on the basis of the visual information image data received externally.

Note that the information processing apparatus 1012 or the server 1013 may include functions other than the function of generating the visual information image among the functions provided to the display device 101.

Furthermore, a type of the information processing apparatus 1012 is not particularly limited. For example, the information processing apparatus 1012 includes a PC, a tablet terminal, a smartphone, a mobile phone, or the like.

<Modification Regarding Projection System>

The configuration example of the projection system 201 described above with reference to FIGS. 2A, 2B, 3A, 3B, and 3C is an example thereof, and can be changed.

<First Modification of Projection System>

Figure 28:
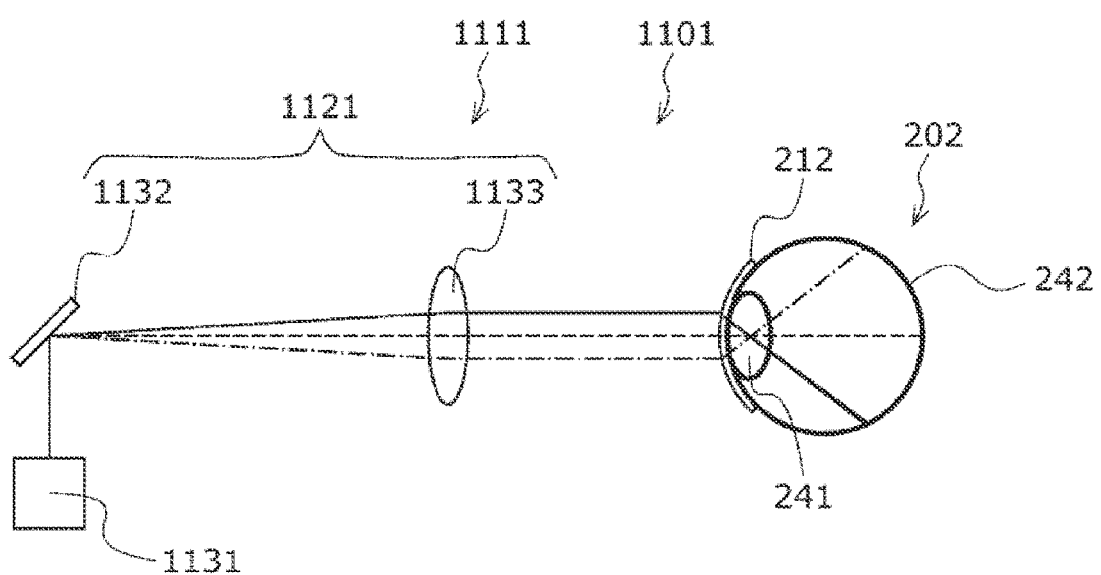
FIG. 28 is a view illustrating a first modification of the projection system.

FIG. 28 illustrates a configuration example of a projection system 1101, which is a first modification of the projection system. Note that, in the figure, portions corresponding to those of the projection system 201 in FIG. 2 are denoted by the same reference numerals, and a description thereof will be omitted as appropriate.

The projection system 1101 includes a projection device 1111 and an optical element 212. The projection device 1111 includes a projection optical system 1121.

The projection optical system 1121 includes a light source 1131, a scanning mirror 1132, and a lens 1133.

The light source 1131 emits a light beam toward the scanning mirror 1132. As the light source 1131, for example, a light emitting diode (LED), a laser diode (LD), or the like is used.

The scanning mirror 1132 may two-dimensionally scan the laser beam emitted from the light source 1131 to cause the laser beam to reach the optical element 212. For example, a micro electro mechanical systems (MEMS) mirror is used as the scanning mirror 1132. The scanning mirror 1132 may move a direction of the laser beam at a high speed so that an image is formed on a retina 242.

The lens 1133 is provided between the light source 1131 and the optical element 212. A laser beam (projection light) projected from the light source 1131 is refracted by the lens 1133 and incident on the optical element 212.

<Second Modification of Projection System>

Figure 29:
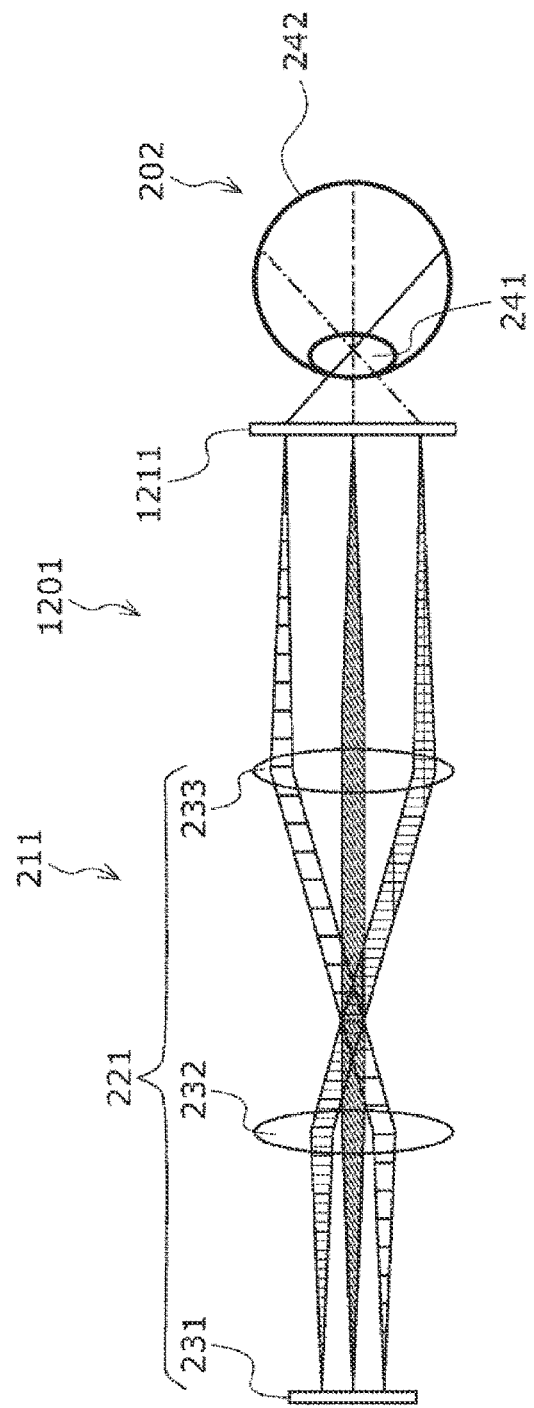
FIG. 29 is a view illustrating a second modification of the projection system.

FIG. 29 illustrates a configuration example of a projection system 1201, which is a second modification of the projection system. Note that, in the figure, portions corresponding to those of the projection system 201 in FIG. 2 are denoted by the same reference numerals, and a description thereof will be omitted as appropriate.

The projection system 1201 differs from the projection system 201 in that an optical element 1211 is provided instead of the optical element 212.

The optical element 1211 is used in a state of not being in contact with a surface of an eyeball.

<Third Modification of Projection System>

Figure 30:
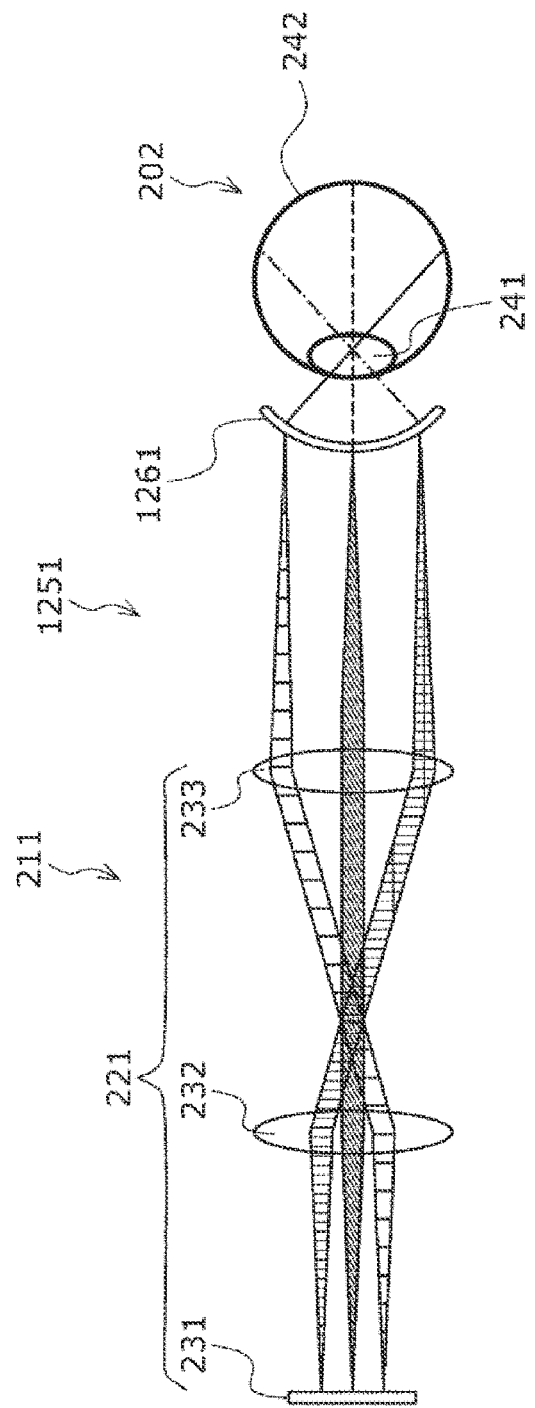
FIG. 30 is a view illustrating a third modification of the projection system.

FIG. 30 illustrates a configuration example of a projection system 1251, which is a third modification of the projection system. Note that, in the figure, portions corresponding to those of the projection system 1201 in FIG. 29 are denoted by the same reference numerals, and a description thereof will be omitted as appropriate.

The projection system 1251 differs from the projection system 1201 in that an optical element 1261 is provided instead of the optical element 1211.

The optical element 1261 is identical to the optical element 1211 in that the optical element 1261 is used in a state of not being in contact with a surface of an eyeball, but is different in that the optical element 1261 has a curved surface.

Note that the projection system is not limited to the above-described configuration as long as the retinal direct drawing can be realized.

<Other Modifications>

Figure 13:
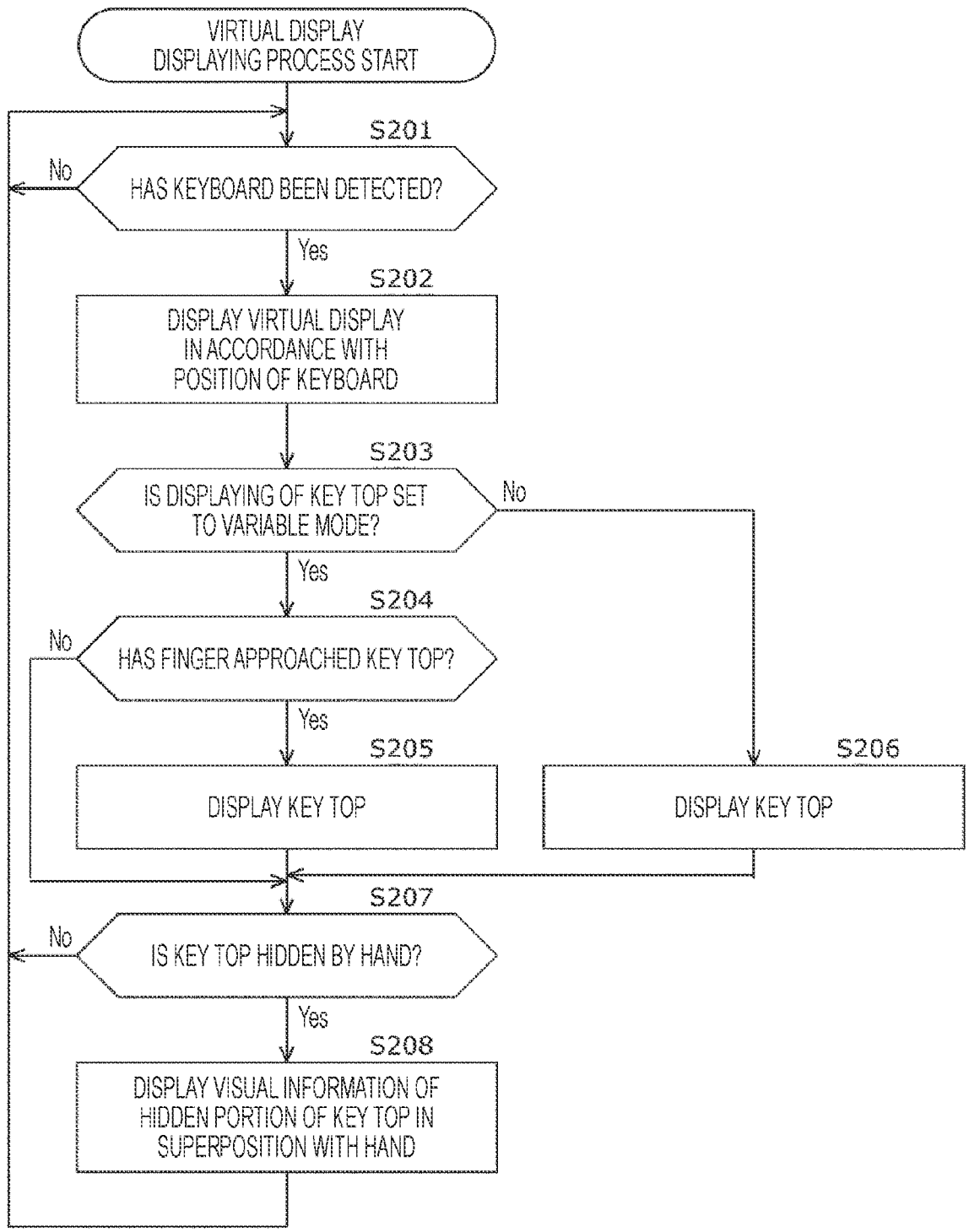
FIG. 13 is a flowchart for explaining a virtual display displaying process.

Although FIGS. 13 to 15 illustrate an example in which the virtual display 603 is displayed on the keyboard 602, the virtual display 603 may be displayed on another operation device. As the another operation device, for example, a switch, a button, a mouse, a key, a knob, a console, or the like, or a combination thereof is assumed.

Furthermore, similarly to displaying of a key top of the keyboard 602, operation support information for support of an operation of the operation device may be displayed as visual information in the field of view of the user. For example, a function of an operation device, an operation method, and the like are assumed as the operation support information.

Furthermore, in the above-described example, an example has been described in which only one window or virtual display is displayed in the user's field of view, but two or more windows or virtual displays may be displayed. In this case, for example, a window or a virtual display in a line-of-sight direction of the user may be set to an active state, and other windows or virtual displays may be set to an inactive state. Then, the window or the virtual display in the active state may be focused, and the window or the virtual display in the inactive state may be blurred.

Moreover, for example, the present technology can also be applied to a case where AR is implemented by using a display device other than the retinal direct drawing method, except for the embodiment of blurring the visual information.

3. Other

The series of processes described above can be executed by hardware or also executed by software. When the series of processes are performed by software, a program that configures the software is installed in a computer. Here, examples of the computer include, for example, a computer that is built in dedicated hardware, a general-purpose personal computer that can perform various functions by being installed with various programs, and the like.

The program executed by the computer can be provided by being recorded in, for example, a removable medium (for example, a removable medium constituting the storage unit 119 of FIG. 1) as a package medium or the like. Furthermore, the program can be provided via a wired or wireless transmission medium such as a local area network, the Internet, or digital satellite broadcasting.

Note that the program executed by the computer may be a program that performs processing in a time series according to an order described in this specification, or may be a program that performs processing in parallel or at necessary timing such as when a call is made.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Note that the embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can also have the following configurations.

(1)

A display device including:

a display unit configured to project a visual information image including visual information onto a retina of a user and display the visual information in superimposition with a field of view of the user; and a visual information control unit configured to control displaying of the visual information by the display unit, in which the display unit displays the visual information that is blurred in accordance with a situation.

(2)

The display device according to (1) described above, in which the display unit displays the visual information that is blurred on the basis of a direction of a line-of-sight of the user.

(3)

The display device according to (2) described above, in which the visual information control unit causes a display position of first visual information to follow a movement of a field of view of the user, and causes a display position of second visual information to be fixed with respect to a real world.

(4)

The display device according to (3) described above, in which the display unit displays the first visual information and the second visual information in which at least one of the first visual information or the second visual information is blurred on the basis of a direction of a line-of-sight of the user.

(5)

The display device according to any one of (1) to (4) described above, in which the display unit displays the visual information in which a vicinity of a boundary with a real world is blurred.

(6)

The display device according to any one of (1) to (5) described above, in which the visual information control unit blurs the visual information in accordance with a situation.

(7)

The display device according to (6) described above, in which the visual information control unit generates the visual information image including the visual information that is blurred in accordance with a situation.

(8)

The display device according to any one of (1) to (7) described above, in which
the visual information control unit controls to change a content of the visual information on the basis of a movement of at least one of a head or a line-of-sight of the user.

(9)

The display device according to any one of (1) to (8) described above, in which
the visual information control unit controls to display the visual information at a position corresponding to a position of a hand in a field of view of the user on the basis of a movement of the hand of the user.

(10)

The display device according to (9) described above, in which
the visual information includes an operation tool that is virtual and is used for operating equipment, and
an equipment control unit configured to control the equipment on the basis of an operation on the operation tool is further provided.

(11)

The display device according to any one of (1) to (10) described above, in which
the visual information control unit controls a display position of the visual information regarding sound emitted from a sound source on the basis of a position of the sound source.

(12)

The display device according to (11) described above, in which
the visual information indicates a state of the sound.

(13)

The display device according to any one of (1) to (12) described above, in which
the visual information includes a virtual display, and
the display unit displays the virtual display at a position corresponding to an operation device in a field of view of the user.

(14)

The display device according to (13) described above, in which
the visual information includes operation support information for support of an operation on the operation device, and
the visual information control unit controls displaying of the operation support information on the basis of a movement of a hand of the user with respect to the operation device.

(15)

The display device according to any one of (1) to (14) described above, in which
the visual information control unit controls sharing of the visual information with another display device.

(16)

The display device according to (15) described above, in which
the display unit displays, in a field of view of the user, the visual information displayed in superimposition with a region overlapping with a field of view of the user, in a field of view of another user who uses the another display device.

(17)

The display device according to (16) described above, in which
the visual information control unit controls displaying of at least one of information indicating an owner of the visual information or information indicating a viewer of the visual information.

(18)

The display device according to any one of (1) to (17) described above, in which
the visual information control unit controls displaying of the visual information that is externally received.

(19)

A display method including:
displaying visual information that is blurred in accordance with a situation,
by using a display device configured to project a visual information image including the visual information onto a retina of a user and display the visual information in superimposition with a field of view of the user.

(20)

A program for causing a computer to execute processing of:
displaying visual information that is blurred in accordance with a situation,
the computer being of a display device configured to project a visual information image including the visual information onto a retina of a user and display the visual information in superimposition with a field of view of the user.

Note that the effects described in this specification are merely examples and are not limited, and other effects may be present.

REFERENCE SIGNS LIST

101 Display device
112 Image capturing unit
113 Sound detection unit
114 Sensor unit
115 Control unit
116 Display unit
201 Projection system
242 Retina
301 Information processing unit
311 Space recognition unit
312 Sound recognition unit
313 Operation detection unit
314 Visual information control unit
316 Equipment control unit
321 Image processing unit
322 Display control unit
323 Sharing control unit
402 Window
511 Sound state information
512 Utterance information
513 Sound state information
514 Utterance information
602 Keyboard
603 Virtual display
721 Visual information
722a, 722b Shadow
731, 732 Visual information
733, 734 Glitter
804 Operation tool
1001 Display system
1011 Display device
1012 Information processing apparatus
1013 Server
1101, 1201, 1251 Projection system

The invention claimed is:

1. A first display device, comprising:
   a projector configured to:
      project a visual information image including visual information onto a retina of a first user of the first display device; and
      display the visual information in superimposition with a field of view of the first user; and
   a processor configured to:
      control the projector to display the visual information;
      blur the visual information based on a specific situation; and
      control sharing of the visual information with a second display device,
         wherein the projector is further configured to display, in superimposition with a region overlapping with the field of view of the first user, the visual information displayed in a field of view of a second user of the second display device.

2. The first display device according to claim 1, wherein the processor is further configured to blur the visual information based on a direction of a line-of-sight of the first user.

3. The first display device according to claim 2, wherein the processor is further configured to
   control a display position of first visual information to follow a movement of the field of view of the first user, and
   control a display position of second visual information to be fixed with respect to a real world.

4. The first display device according to claim 3, wherein the projector is further configured to display the first visual information and the second visual information in which at least one of the first visual information or the second visual information is blurred based on the direction of the line-of-sight of the first user.

5. The first display device according to claim 1, wherein the projector is further configured to display the visual information in which a vicinity of a boundary with a real world is blurred.

6. The first display device according to claim 1, wherein the processor is further configured to generate the visual information image including the visual information that is blurred based on the specific situation.

7. The first display device according to claim 1, wherein the processor is further configured to change a content of the visual information based on a movement of at least one of a head or a line-of-sight of the first user.

8. The first display device according to claim 1, wherein the processor is further configured to control, based on a movement of a hand of the first user, the projector to display the visual information at a position corresponding to a position of the hand in the field of view of the first user.

9. The first display device according to claim 8, wherein
   the visual information includes a virtual operation tool for operating an equipment, and
   the processor is further configured to control the equipment based on an operation on the virtual operation tool.

10. The first display device according to claim 1, wherein the processor is further configured to control, based on a position of a sound source, a display position of the visual information regarding sound emitted from the sound source.

11. The first display device according to claim 10, wherein the visual information indicates a state of the sound.

12. The first display device according to claim 1, wherein
   the visual information includes a virtual display, and
   the projector is further configured to display the virtual display at a position corresponding to an operation device in the field of view of the first user.

13. The first display device according to claim 12, wherein
   the visual information includes operation support information for support of an operation on the operation device, and
   the processor is further configured to control display of the operation support information based on a movement of a hand of the first user with respect to the operation device.

14. The first display device according to claim 1, wherein the processor is further configured to control display of at least one of information indicating an owner of the visual information or information indicating a viewer of the visual information.

15. The first display device according to claim 1, wherein the processor is further configured to control the projector to display the visual information that is externally received.

16. A display method, comprising:
   projecting a visual information image including visual information onto a retina of a first user of a first display device;
   displaying the visual information in superimposition with a field of view of the first user;
   blurring the visual information based on a specific situation;
   controlling sharing of the visual information with a second display device; and
   displaying, in superimposition with a region overlapping with the field of view of the first user, the visual information displayed in a field of view of a second user of the second display device.

17. A non-transitory computer-readable medium having stored thereon computer-executable instructions, which when executed by a processor, cause the processor to execute operations, the operations comprising:
   controlling projection of a visual information image including visual information onto a retina of a first user of a first display device;
   controlling display of the visual information in superimposition with a field of view of the first user;
   blurring the visual information based on a specific situation;
   controlling sharing of the visual information with a second display device; and
   controlling display, in superimposition with a region overlapping with the field of view of the first user, of the visual information displayed in a field of view of a second user of the second display device.

* * * * *